(12) United States Patent
Park et al.

(10) Patent No.: US 10,742,291 B2
(45) Date of Patent: Aug. 11, 2020

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Jonghyun Park, Seoul (KR); Kijun Kim, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/066,998

(22) PCT Filed: Dec. 28, 2016

(86) PCT No.: PCT/KR2016/015404
§ 371 (c)(1),
(2) Date: Jun. 28, 2018

(87) PCT Pub. No.: WO2017/116141
PCT Pub. Date: Jul. 6, 2017

(65) Prior Publication Data
US 2019/0181936 A1    Jun. 13, 2019

Related U.S. Application Data

(60) Provisional application No. 62/272,666, filed on Dec. 29, 2015.

(51) Int. Cl.
*H04B 7/06*    (2006.01)
*H04B 7/0413*    (2017.01)
(Continued)

(52) U.S. Cl.
CPC ......... *H04B 7/0626* (2013.01); *H04B 7/0413* (2013.01); *H04B 7/0647* (2013.01); *H04L 5/0005* (2013.01); *H04W 76/27* (2018.02)

(58) Field of Classification Search
CPC .......... H04B 7/04; H04B 7/06; H04B 7/0626; H04B 7/0647; H04L 5/0005;
(Continued)

(56) References Cited

U.S. PATENT DOCUMENTS

2012/0281567 A1    11/2012 Gao et al.
2015/0029966 A1    1/2015 Park et al.
(Continued)

FOREIGN PATENT DOCUMENTS

WO    20140129716 A1    8/2014

OTHER PUBLICATIONS

Samsung.;"NZP CSI-RS Configuration and RE Mapping for Class A CSI Reporting"; R1-155483, 3GPP TSG RAN WGI Meeting #82bis, Malm, Sweden, Sep. 25, 2015.

*Primary Examiner* — David B Lugo
(74) *Attorney, Agent, or Firm* — Dentons US LLP

(57) ABSTRACT

In an aspect of the present invention, a method for reporting channel state information (CSI) of a UE in a wireless communication system includes: receiving, from an eNB, CSI-RS resource information related to a CSI-RS resource to which a channel state information-reference signal (CSI-RS) is mapped; receiving the CSI-RS transmitted through one or more antenna ports from the eNB based on the received CSI-RS resource information; and reporting CSI generated based on the received CSI-RS to the eNB, in which the CSI-RS resource is configured by aggregating a plurality of CSI-RS resources, and the aggregated CSI-RS
(Continued)

resources are respectively positioned in different subframes on a time axis or in different resource blocks on a frequency axis.

13 Claims, 26 Drawing Sheets

(51) Int. Cl.
*H04W 76/27* (2018.01)
*H04L 5/00* (2006.01)

(58) Field of Classification Search
CPC ... H04L 5/0023; H04L 5/0048; H04L 5/0091; H04W 76/27
See application file for complete search history.

(56) References Cited

U.S. PATENT DOCUMENTS

| | | |
|---|---|---|
| 2015/0200757 A1 | 7/2015 | Wu et al. |
| 2017/0048037 A1* | 2/2017 | Yen ............... H04B 7/0695 |
| 2017/0070994 A1* | 3/2017 | Rico Alvarino ........ H04W 4/70 |
| 2017/0134130 A1* | 5/2017 | Li ........................ H04L 1/0026 |
| 2017/0180194 A1* | 6/2017 | Noh ..................... H04L 5/005 |

* cited by examiner (a)

METHOD FOR TRANSMITTING AND RECEIVING CHANNEL STATE INFORMATION IN WIRELESS COMMUNICATION SYSTEM AND APPARATUS THEREFOR

This application is a 35 USC § 371 National Stage entry of International Application No. PCT/KR2016/015404, filed on Dec. 28, 2016, and claims priority to U.S. Provisional Application No. 62/272,666, filed on Dec. 29, 2015, all of which are incorporated by reference in their entirety herein.

TECHNICAL FIELD

The present invention relates to a wireless communication system and, more specifically, to a method for transmitting and receiving channel state information (CSI) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for transmitting and receiving channel state information (CSI)

In addition, an object of the present invention is to provide an efficient method for aggregating CSI-RS resources for a smaller number of ports in order to design CSI-RS resources for a larger number of ports.

The objects of the present invention are not limited to the technical objects described above, and other technical that are objects not mentioned herein may be understood to those skilled in the art from the description below.

Technical Solution

In one aspect of the present invention, a method for reporting channel state information (CSI) of a UE in a wireless communication system includes: receiving, from an eNB, CSI-RS resource information about a CSI-RS resource to which a channel state information-reference signal (CSI-RS) is mapped; receiving the CSI-RS transmitted through one or more antenna ports from the eNB based on the received CSI-RS resource information; and reporting CSI generated based on the received CSI-RS to the eNB, wherein the CSI-RS resource is configured by aggregating a plurality of CSI-RS resources, wherein the aggregated CSI-RS resources are respectively positioned in different subframes on a time axis or in different resource blocks on a frequency axis.

At least one of the aggregated CSI-RS resources may correspond to a composite CSI-RS resource configured by aggregating a plurality of legacy CSI-RS resources.

The plurality of legacy CSI-RS resources constituting the composite CSI-RS resource may be limited to CSI-RS resources of the same number of ports.

The CSI-RS resource may be limited such that the CSI-RS is configured by aggregating CSI-RS resources of a predefined number of ports.

The different subframes in which the aggregated CSI-RS resources are positioned may have different CSI-RS subframe offsets.

When the aggregated CSI-RS resources are respectively positioned in the different subframes having a spacing of a predetermined number of subframes therebetween, information related to the spacing of the predetermined number of subframes may be transmitted to the UE through radio resource control (RRC) signaling.

When the aggregated CSI-RS resources are respectively positioned in different subframes on the time axis, the aggregated CSI-RS resources may be mapped to the same subcarriers in the different subframes.

When the aggregated CSI-RS resources are respectively positioned in different resource blocks having a spacing of a predetermined number of resources blocks therebetween, information related to the spacing of the predetermined number of resource blocks may be transmitted to the UE through RRC signaling.

A transmission periodicity of the different resource blocks in which the aggregated CSI-RS resources are positioned is set to be same for each the aggregated CSI-RS resource, and a resource block offset of the different resource blocks is set differently for each the aggregated CSI-RS resource.

The transmission periodicity and the resource block offsets may be joint-encoded and transmitted to the UE.

When at least one of the aggregated CSI-RS resources corresponds to a 12-port CSI-RS resource or a 16-port CSI-RS resource, the CSI-RS mapped to the 12-port CSI-RS resource or the 16-port CSI-RS resource is applied with code division multiplexing (CDM) in which the number of orthogonal weight vectors is 2 or 4.

The CSI-RS is applied with CDM in which the number of orthogonal weight vectors is 6, 8, 12, 8 or 20 according to the number of ports of each of the CSI-RS resources aggregated into the CSI-RS resource to which the CSI-RS is mapped.

When the CSI-RS resource corresponds to a 24-port CSI-RS resource configured by aggregating first to third 8-port CSI-RS resources in which the first to third 8-port CSI-RS resources are mapped, the first to third 8-port CSI-RS resources may be positioned in third and fourth OFDM symbol regions of a second slot in a single subframe on the time axis, wherein the first 8-port CSI-RS resource is positioned in first to fourth subcarrier regions on the frequency axis, the second 8-port CSI-RS resource is positioned in fifth to eighth subcarrier regions on the frequency axis, and the third 8-port CSI-RS resource is positioned in ninth to twelfth subcarrier regions on the frequency axis.

CSI-RS mapped to each of the first to third 8-port CSI resources is applied to CDM in which the number of orthogonal weight vectors is 8.

In another aspect of the present invention, a UE transmitting channel state information (CSI) in a wireless communication system includes: a radio frequency (RF) unit for transmitting and receiving radio signals; and a processor for controlling the RF unit, wherein the processor is configured: to receive, from an eNB, CSI-RS resource information related to a CSI-RS resource to which a CSI-RS is mapped; to receive the CSI-RS transmitted through one or more antenna ports from the eNB based on the received CSI-RS resource information; and to report CSI generated based on the received CSI-RS to the eNB, wherein the CSI-RS resource is configured by aggregating a plurality of CSI-RS resources, and the aggregated CSI-RS resources are respectively positioned in different subframes on a time axis or in different resource blocks on a frequency axis.

At least one of the aggregated CSI-RS resources may correspond to a composite CSI-RS resource configured by aggregating a plurality of legacy CSI-RS resources.

The plurality of legacy CSI-RS resources constituting the composite CSI-RS resource may be limited to CSI-RS resources having the same number of ports.

Advantageous Effects

According to embodiments of the present invention, a UE can easily derive CSI and feed back the CSI to a base station.

In addition, when a CSI-RS pattern according to an embodiment of the present invention is used, it is possible to derive/use a new efficient CSI-RS pattern without considerably modifying a legacy system because a CSI-RS pattern of the legacy system is reused. Furthermore, compatibility between a new system and the legacy system can be maintained.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included herein as a part of the description for help understanding the present invention, provide embodiments of the present invention, and describe the technical features of the present invention with the description below.

FIG. 21 illustrates 5 legacy CSI-RS configurations which can be used by 8 CSI-RS antenna ports for CSI-RS transmission.

BEST MODE

Figure 1:
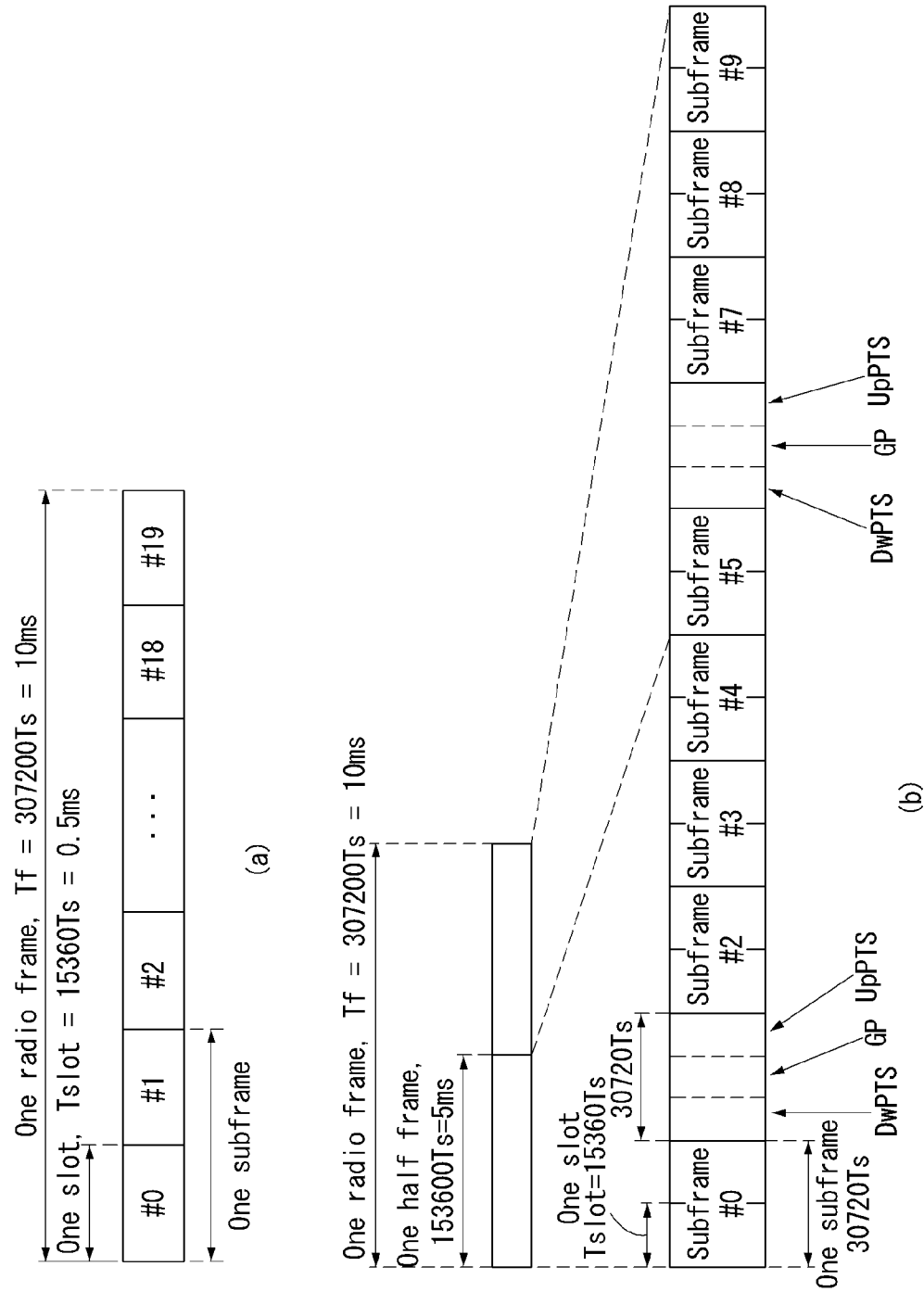
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot = 15360 * T\_s = 0.5$ ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
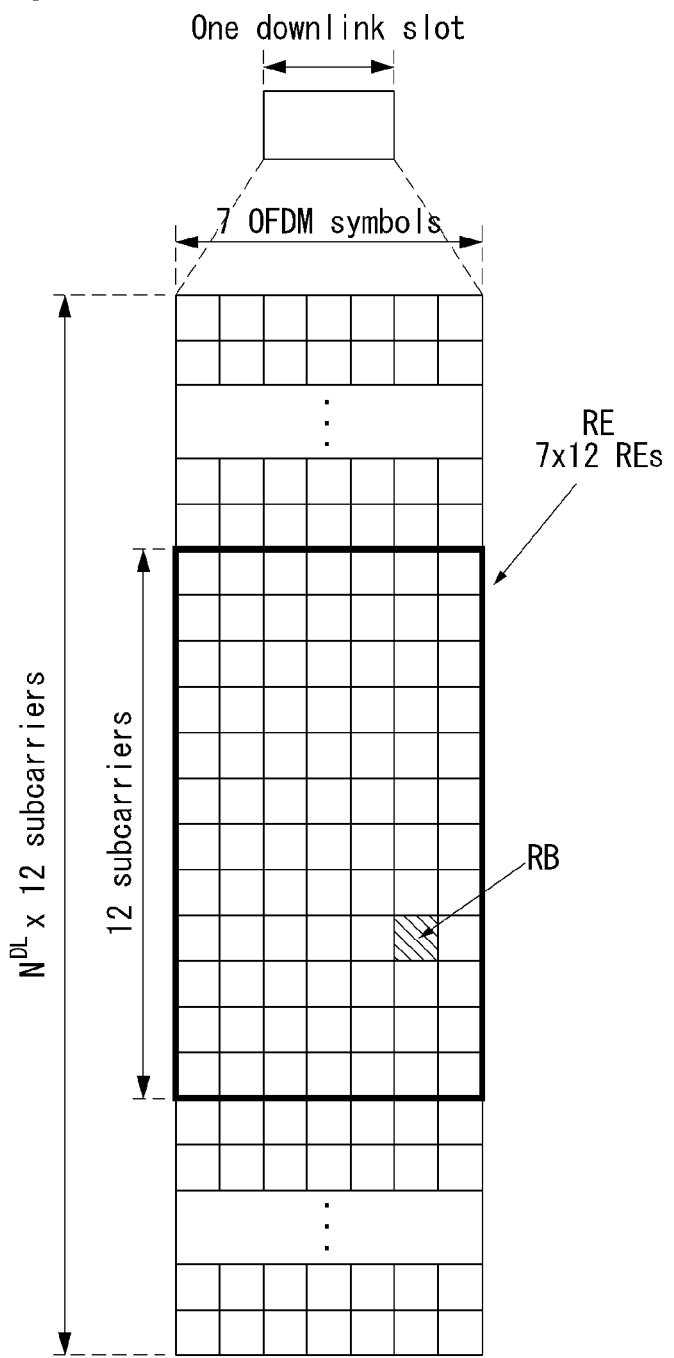
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
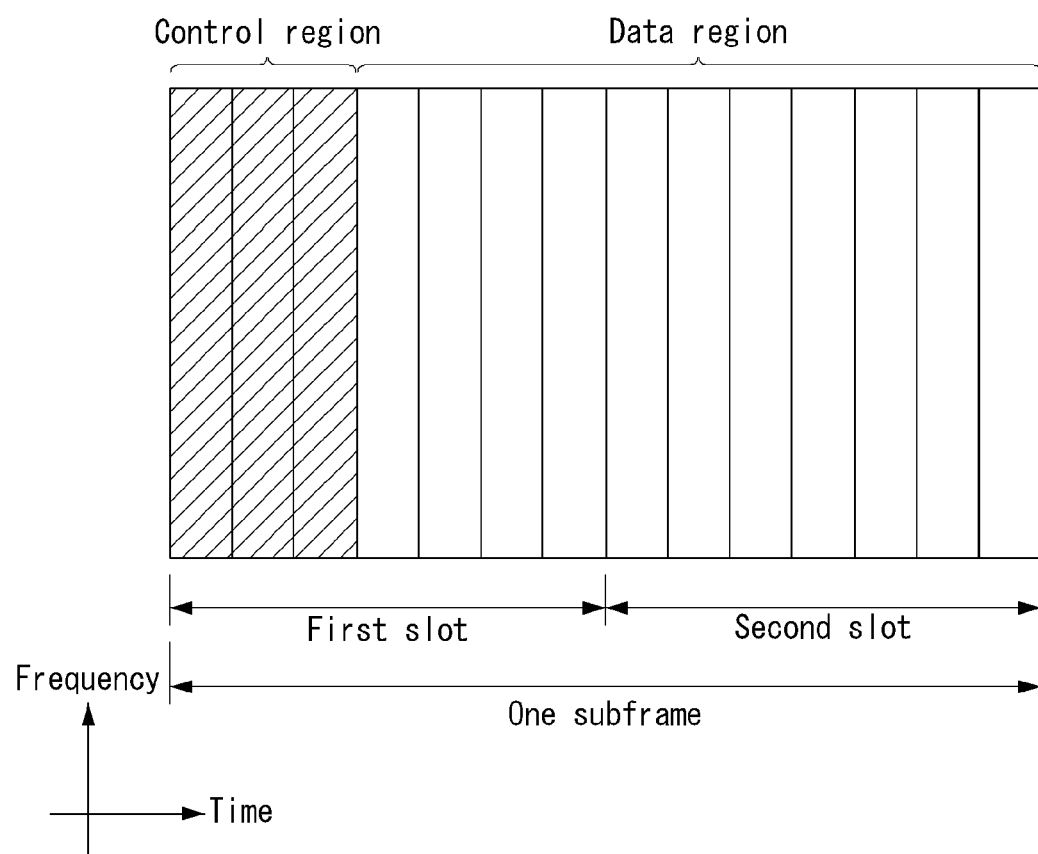
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
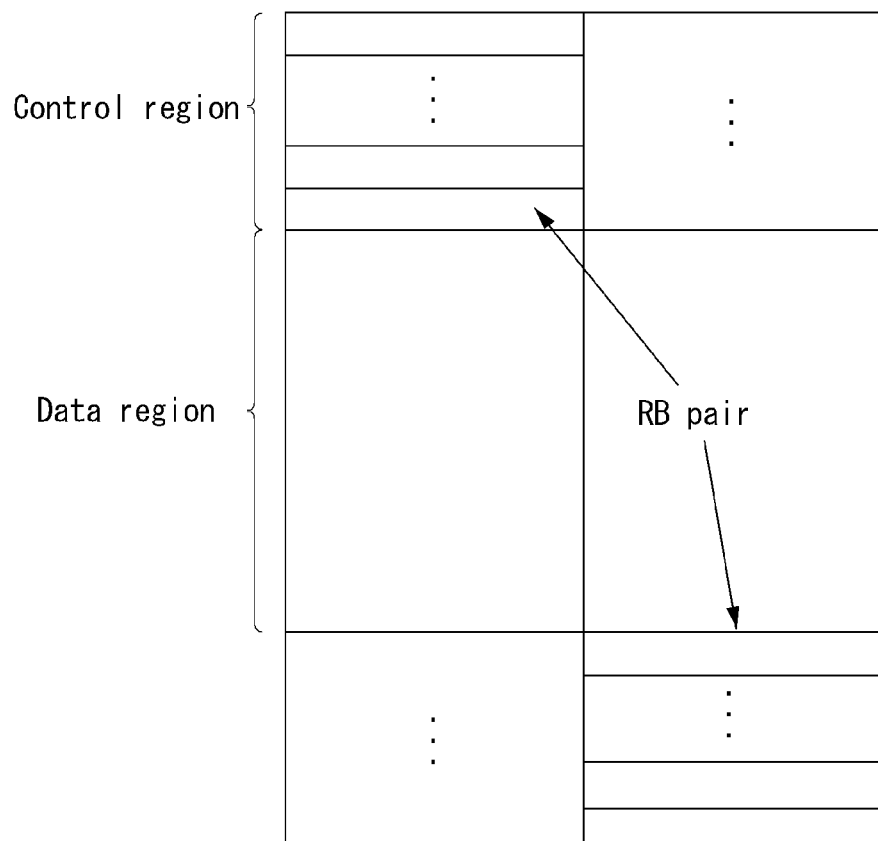
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx)

antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
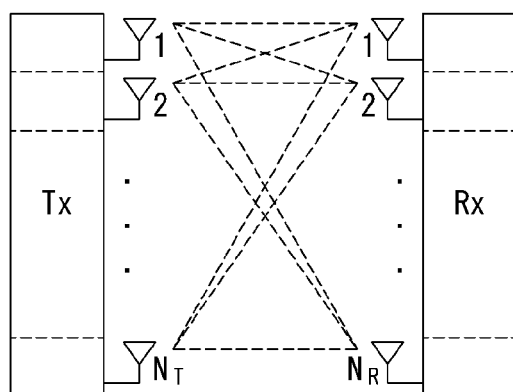
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T$$ [Equation 2]

Meanwhile, transmission power may be different in each of pieces of transmission information s_1, s_2, s_NT. In this case, if pieces of transmission power are P_1, P_2, P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, x_NT that are actually transmitted. In this case, the weight matrix functions to properly distribute the transmission information to antennas according to a transport channel condition. The following may be represented using the transmission signals x_1, x_2, x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$ [Equation 5]

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, y_NR of the respective antennas are represented as follows using a vector y.

$$y = [y_1, y_2, \Lambda, y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
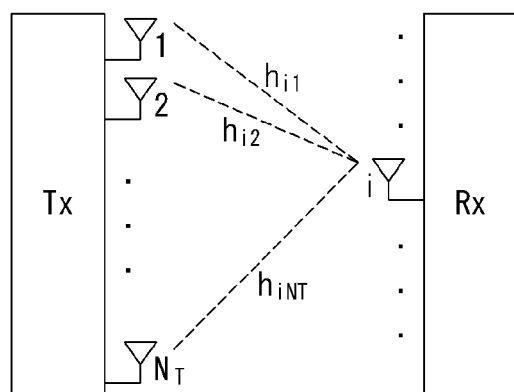
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \Lambda, h_{iN_T}]$$ [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix}$$ [Equation 8]

Meanwhile, Additive White Gaussian Noise (AWGN) is added to an actual channel after the actual channel experiences the channel matrix H. Accordingly, AWGN n_1, n_2, n_NR added to the N_R reception antennas, respectively, are represented using a vector as follows.

$$n = [n_1, n_2, \Lambda, n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & M \\ h_{i1} & h_{i2} & \Lambda & h_{iN_T} \\ M & & O & M \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7:
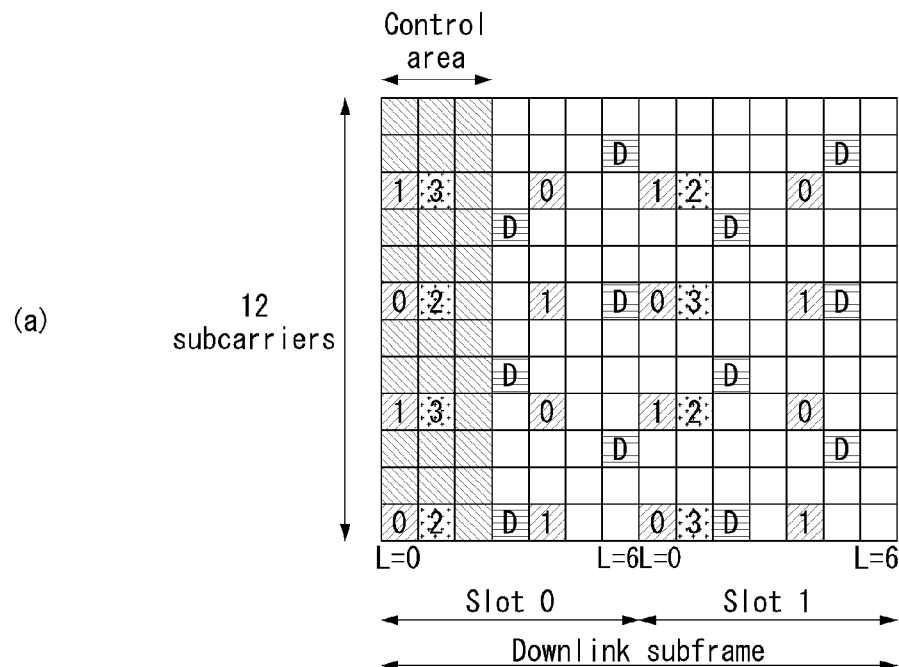
FIG. 7 illustrates reference signal patterns mapped to downlink resource block pairs in a wireless communication system to which the present invention may be applied.
Figure 7:
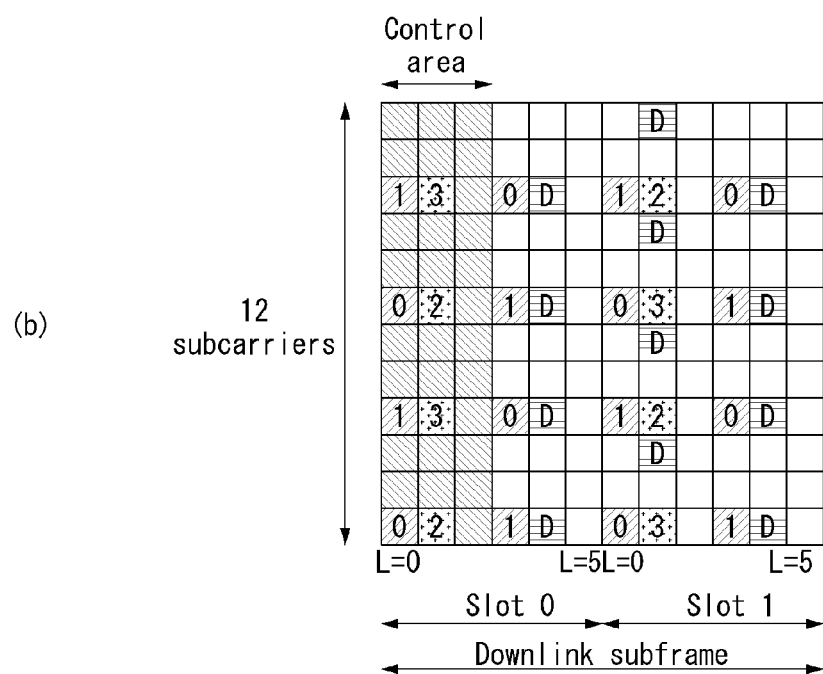

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain× 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval Δf=15 kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m')$$ [Equation 12]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |

TABLE 4-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 8:
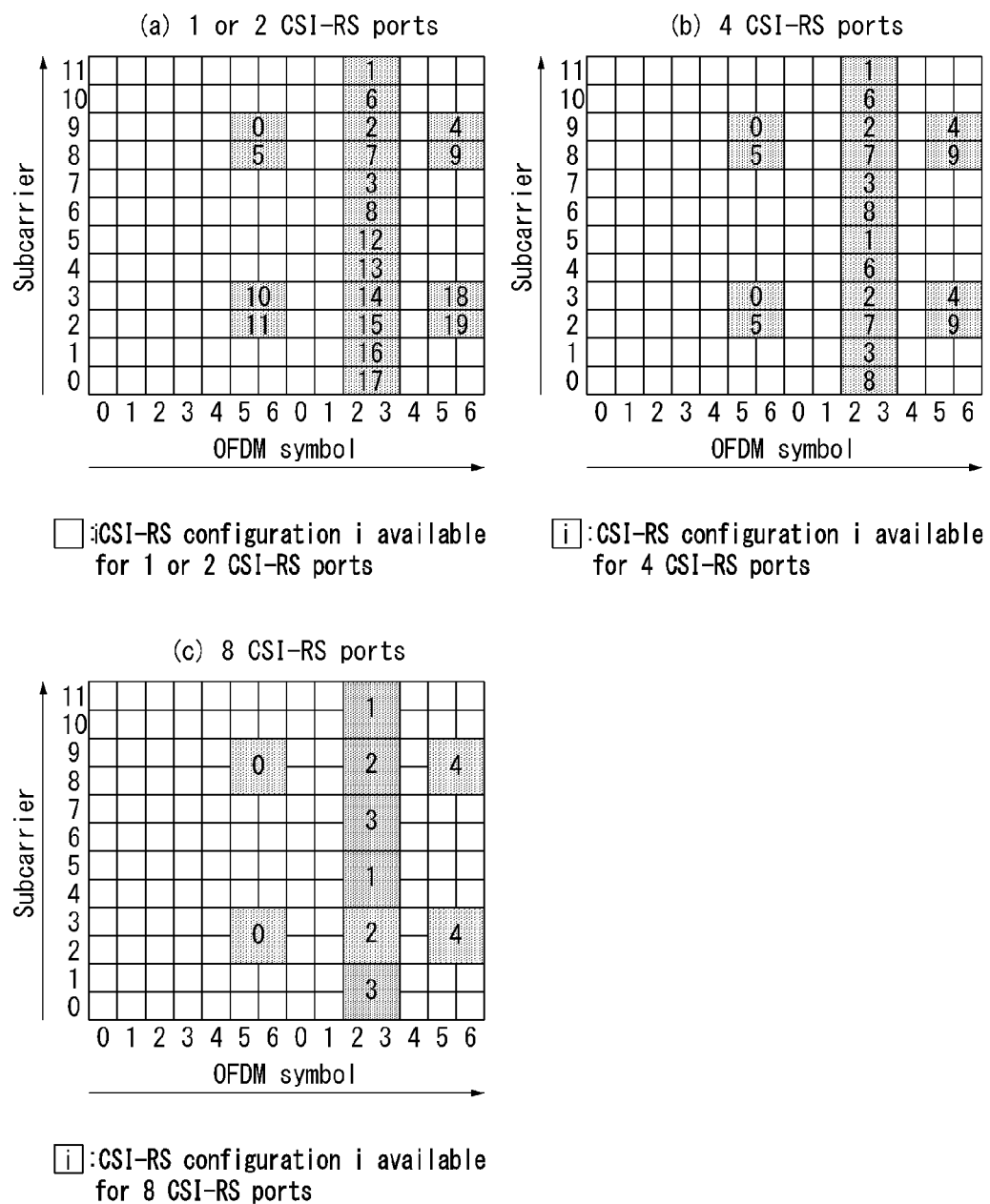
FIG. 8 is a diagram illustrating resources to which reference signals are mapped in a wireless communication system to which the present invention may be applied.

FIG. 8 is a diagram illustrating resources to which reference signals are mapped in a wireless communication system to which the present invention may be applied. Particularly, FIG. 8 illustrates CSI-RS patterns for cases in which the number of CSI-RS antenna ports is 1 or 2, 4 and 8 in a subframe to which a normal CP is applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM (Code Division Multiplexing) for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

Figure 9:
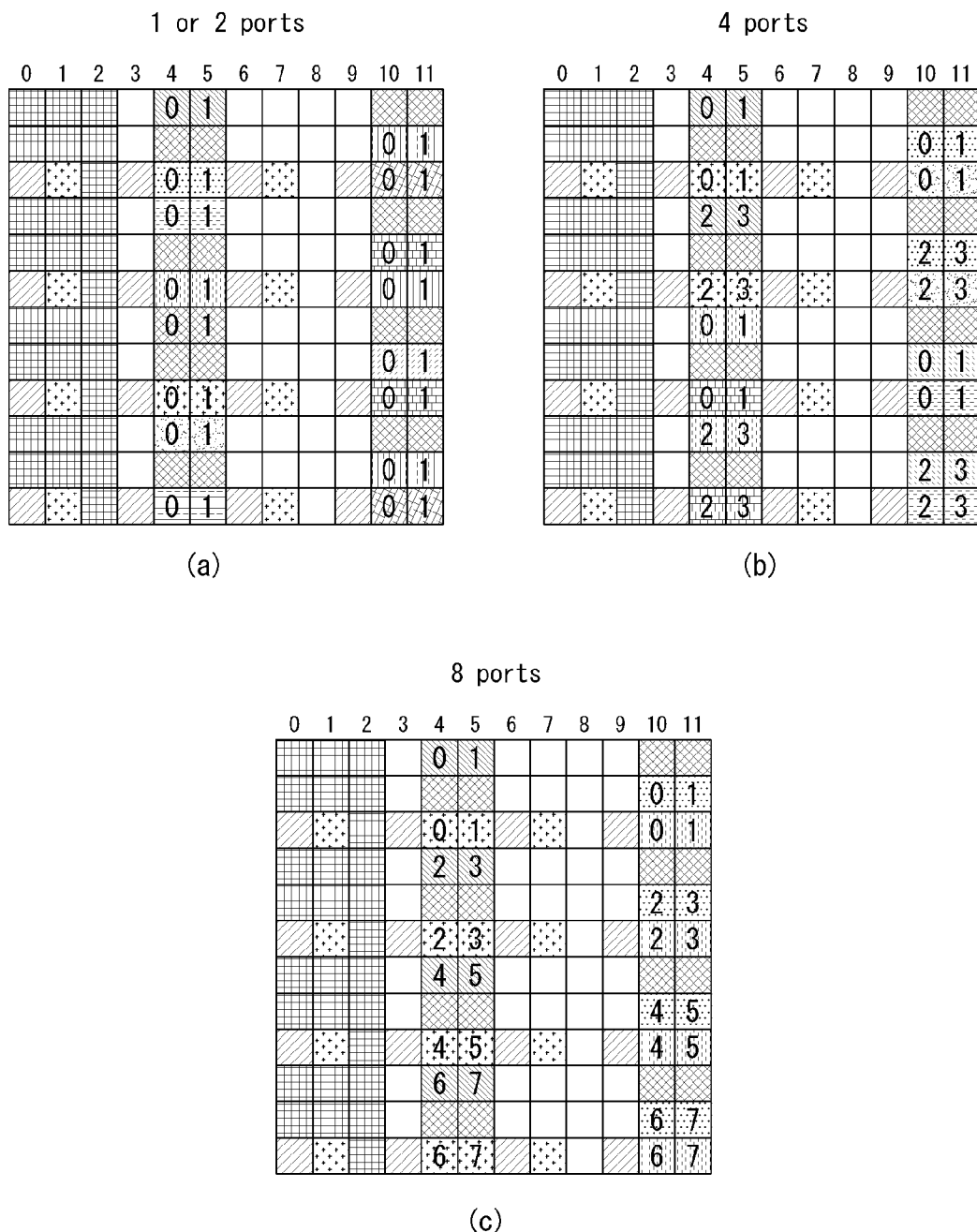
FIG. 9 illustrates resources to which reference signals are mapped in a wireless communication system to which the present invention is applicable.

FIG. 9 illustrates resources to which reference signals are mapped in a wireless communication system to which the present invention is applicable.

Particularly, FIG. 9 shows CSI-RS patterns for cases in which the number of CSI-RS antenna ports is 1 or 2, 4 and 8 in a subframe to which an extended CP is applied.

FIG. 9(a) shows 16 CSI-RS configurations which can be used for CSI-RS transmission through 1 or 2 CSI-RS antenna ports, FIG. 9(b) shows 8 CSI-RS configurations which can be used for CSI-RS transmission through 4 CSI-RS antenna ports, and FIG. 9(c) shows 4 CSI-RS configurations which can be used for CSI-RS transmission through 8 CSI-RS antenna ports.

In this manner, radio resources (i.e., RE pairs) for CSI-RS transmission are determined depending on each CSI-RS configuration.

When one or two antenna ports are set for CSI-RS transmission for a specific cell, CSI-RSs are transmitted on radio resources according to a set CSI-RS configuration among the 16 CSI-RS configurations shown in FIG. 9(a).

Similarly, when 4 antenna ports are set for CSI-RS transmission for a specific cell, CSI-RSs are transmitted on radio resources according to a set CSI-RS configuration among the 8 CSI-RS configurations shown in FIG. 9(b). Further, when 8 antenna ports are set for CSI-RS transmission for a specific cell, CSI-RSs are transmitted on radio resources according to a set CSI-RS configuration among the 4 CSI-RS configurations shown in FIG. 9(c). A plurality of CSI-RS configurations may be used in a single cell. Only zero or one CSI-RS configuration may be used for a non-zero power (NZP) CSI-RS and zero or multiple CSI-RS configurations may be used for a zero power (ZP) CSI-RS.

For each bit set to 1 in a zero-power (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
| --- | --- | --- |
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}R}$-35 |
| 75-154 | 80 | $I_{CSI\text{-}RS}$-75 |

Referring to Table 5, CSI-RS periodicity $T_{CSI\text{-}RS}$ and a subframe offset $\Delta_{CSI\text{-}RS}$ are determined depending on CSI-RS subframe configuration $I_{CSI\text{-}RS}$.

The CSI-RS subframe configuration in Table 5 may be set to one of the aforementioned 'SubframeConfig' field and 'zeroTxPowerSubframeConfig' field. The CSI-RS subframe configuration may be separately set for an NZP CSI-RS and a ZP CSI-RS.

A subframe including a CSI-RS satisfies Equation 13.

$$(10n_f + \lfloor n_s/2 \rfloor - \Delta_{CSI\text{-}RS}) \bmod T_{CSI\text{-}RS} = 0$$

【Equation 13】

In Equation 13, $T_{CSI\text{-}RS}$ indicates CSI-RS periodicity, $\Delta_{CSI\text{-}RS}$ indicates a subframe offset value, $n_f$ denotes a system frame number, and $n_s$ denotes a slot number.

In the case of a UE for which transmission mode 9 is set with respect to a serving cell, a single CSI-RS resource configuration may be set for the UE. In the case of a UE for which transmission mode 10 is set with respect to the serving cell, one or more CSI-RS resource configurations may be set for the UE.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP.

Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
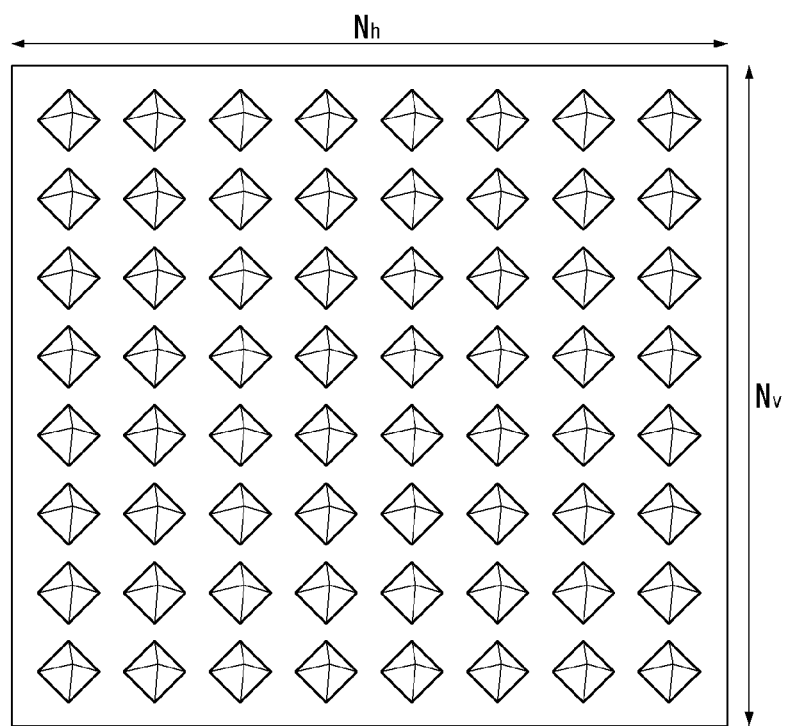
FIG. 10 illustrates a two-dimensional (2D) active antenna system having 64 antenna elements in a wireless communication system to which the present invention is applicable.

FIG. 10 illustrates a 2D AAS having 64 antenna elements in a wireless communication system to which the present invention is applicable.

FIG. 10 illustrates a normal 2D antenna array. A case in which $N_t = N_v \cdot N_h$ antennas are arranged in a square form, as shown in FIG. 10, may be considered. Here, $N_h$ indicates the number of antenna columns in the horizontal direction and $N_v$ indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beam-forming.

Figure 11:
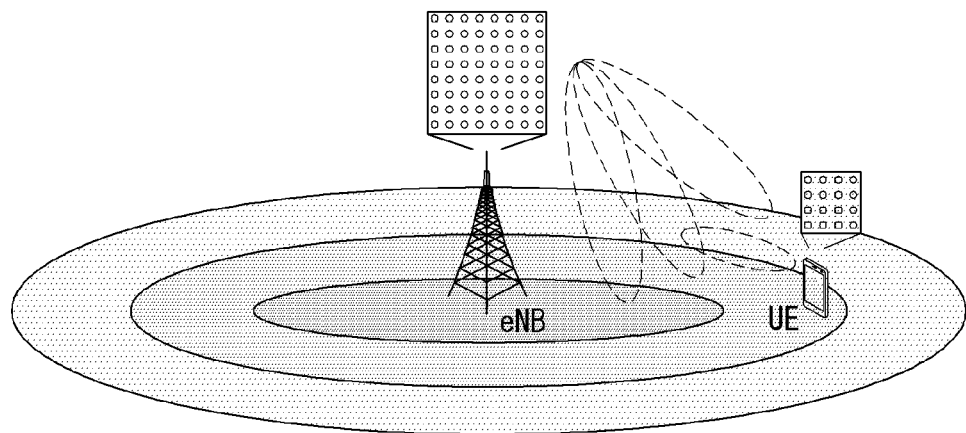
FIG. 11 illustrates a system in which a base station or a UE has a plurality of transmission/reception antennas capable of forming AAS based three-dimensional (3D) beams in a wireless communication system to which the present invention is applicable.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
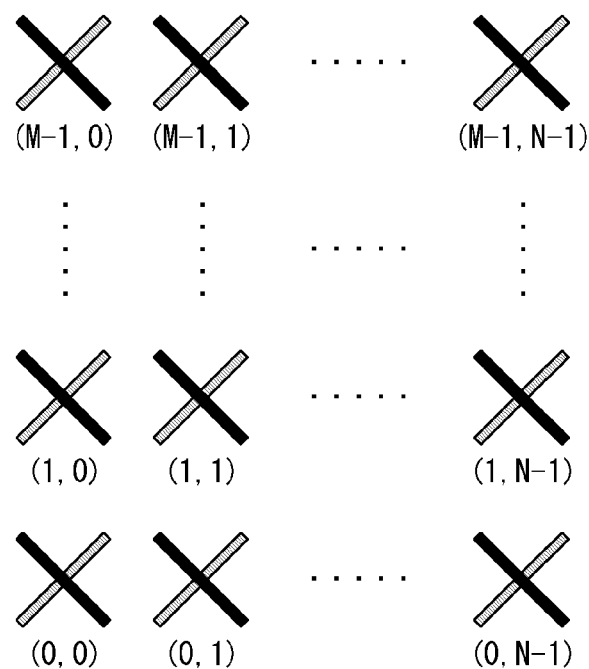
FIG. 12 illustrates a 2D antenna system having cross polarization in a wireless communication system to which the present invention is applicable.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 11, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13:
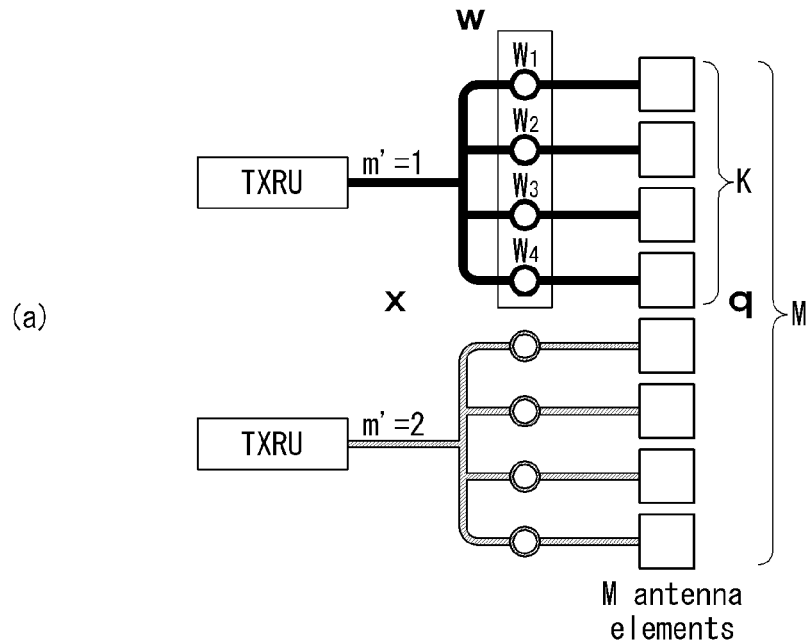
FIG. 13 illustrates transceiver unit models in a wireless communication system to which the present invention is applicable.
Figure 13:
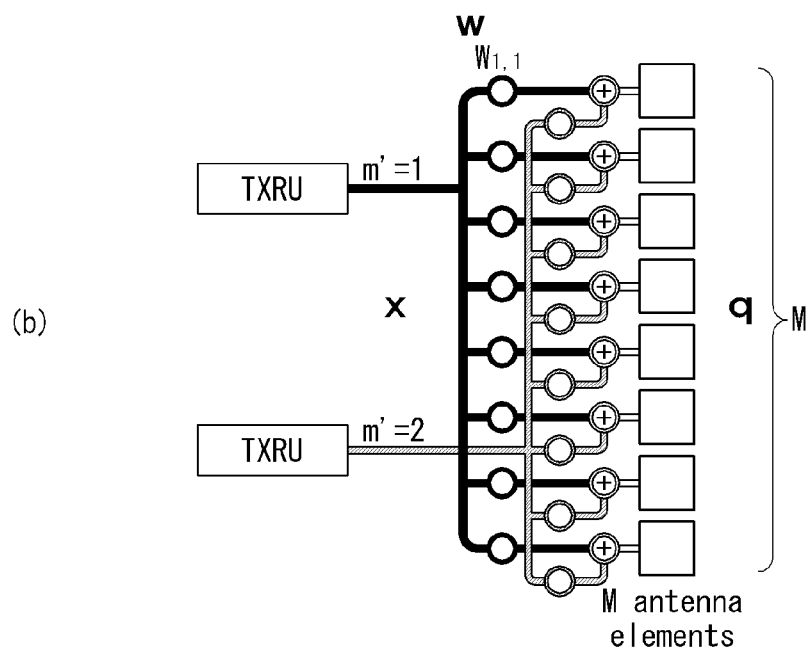

FIG. 13 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 12(a) and TXRU virtualization model option-2: full-connection model as shown in FIG. 12(b) according to correlation between antenna elements and TXRU.

Referring to FIG. 13(a), antenna elements are partitioned into multiple antenna element groups and each TXRU is connected to one of the groups in the case of the sub-array partition model.

Referring to FIG. 13(b), multiple TXRU signals are combined and delivered to a single antenna element (or antenna element array) in the case of the full-connection model.

In FIG. 13, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 13 shows an example of TXRU-to-antenna element mapping and the present invention is not limited thereto. The present invention may be equally applied to mapping between TXRUs and antenna elements realized in various manners in terms of hardware.

Channel State Information Transmission/Reception Method

In a massive MIMO system using a 2D-AAS, CSI-RS patterns for a large number of RS ports need to be supported/designed in order for a UE to acquire CSI and report the same to an eNB. Typically, the legacy system supports 1-port, 2-port, 4-port and 8-port CSI-RS patterns and Rel. 13 supports 12-port and 16-port patterns realized by aggregating conventional 4-port and/or 8-port CSI-RS patterns. To achieve higher spectral efficiency in the future, it is necessary to consider new CSI-RS patterns for a larger number of ports (e.g., 20 ports, 24 ports, 28 ports, 32 ports, 64 ports and the like) and method of configuring the same.

This is because, when a Q-port CSI-RS pattern (e.g., Q≤MNP) is configured for a UE in order to support effective (closed-loop) MIMO transmission from a transmitter including a large number of (e.g., M×N×P) transmission antenna elements like a massive MIMO system, the UE needs to be able to measure the Q-port CSI-RS to derive/calculate CSI. Such a Q-port CSI-RS is a non-precoded CSI-RS, and beamforming is not applied to the Q-port CSI-RS when it is transmitted from the transmitter. The Q-port CSI-RS may be transmitted in such a manner that each CSI-RS port having a wide beam width is transmitted.

In the present description, options that can be considered for new CSI-RS pattern designs mapped to X or more antenna ports (e.g., X=18) are as follows.

First embodiment: a method of aggregating and legacy patterns (2-port, 4-port and 8-port patterns) and 12-port and 16-port patterns defined in Rel. 13 and using aggregated patterns Second Embodiment: A Method of Defining New Patterns The second embodiment is a method of defining a plurality of CSI-RS patterns by selecting/using at least one of CSI-RS designs defined/represented by the first embodiment.

As a more specific embodiment with respect to the first embodiment, a 20-port CSI-RS resource/pattern may be considered. To generate the 20-port CSI-RS resource/pattern, 10 2-port CSI-RS resources/patterns or 5 4-port CSI-RS resources/patterns may be aggregated. A total of $_{20}C_{10}$=184756 20-port CSI-RS resources/patterns can be derived when 10 2-port CSI-RS resources/patterns are aggregated and a total of $_{10}C_{5}$=252 20-port CSI-RS resources/patterns can be derived when 5 4-port CSI-RS resources/patterns are aggregated.

However, increasing the number of aggregated CSI-RS resources causes a problem of system complexity increase. Accordingly, to prevent such complexity increase, the present description proposes a method of designing X-port or more (X corresponding to a natural number, e.g., X=18) CSI-RS resources/patterns based on aggregation of 2 CSI-RS resources.

The CSI-RS resource/pattern design method proposed in the present description configures new 20-port or more CSI-RS resources/patterns by aggregating a plurality of (e.g., 2) CSI-RS resources/patterns. Here, the unit of aggregated ports may be newly defined as ports more than the legacy 2-, 4- and 8-port and 12-, 16- and 20-port defined in Rel. 13. More specifically, each aggregated CSI-RS resource/pattern may correspond to a "composite CSI-RS resource/pattern". Here, a composite CSI-RS resource/pattern may refer to a single CSI-RS resource/pattern defined by aggregating a plurality of legacy CSI-RS resources/patterns defined in Rel. 13. For example, a composite CSI-RS resource/pattern may refer to a single 16-port CSI-RS resource/pattern composed of two legacy 8-port CSI-RS resources/patterns defined in Rel. 13 or a single 12-port CSI-RS resource/pattern composed of three legacy 4-port CSI-RS resources.

However, the "composite CSI-RS resource/pattern" defined by aggregating legacy CSI-RS resources in the present description does not refer to a CSI-RS resource obtained by arbitrarily aggregating legacy CSI-RS resources/pattern but refers to only a CSI-RS resource/pattern aggregated under limited conditions. Only a composite CSI-RS resource/pattern defined in this manner corresponds to at least one (i.e., an aggregation unit) of a plurality of (e.g., 2) CSI-RS resources/patterns aggregated in order to configure new 20-port or more CSI-RS resources/patterns proposed in the present description.

As representative specific restrictions/conditions, the number of ports of CSI-RS resources/patterns aggregated into a composite CSI-RS resource may be limited to a predefined value. For example, a 16-port CSI-RS resource/pattern as a permitted composite CSI-RS resource/pattern can be limited to only resources/patterns realized by aggregating 8-port+8-port resources/patterns (i.e., two legacy 8-port CSI-RS resources/patterns), and a 12-port CSI-RS resource/pattern may refer to only resources/patterns realized by aggregating 4-port+4-port+4-port resources/patterns. That is, when the number of ports of CSI-RS resources/patterns aggregated into a specific CSI-RS resource/pattern corresponds to preset n ports, the corresponding specific CSI-RS resources/patterns correspond to composite CSI-RS resources/patterns and thus can be used as a CSI-RS resource aggregation unit proposed in the present description.

In addition, restrictive application of CDM-2 and/or CDM-4, limitation of RE positions to which CDM is applied to specific positions and/or restrictive application of CDM-x (x>4) may be set as specific restrictions/conditions.

In the present description, "CDM-x" may be interpreted as CDM in which the length of an orthogonal sequence included in a weight vector is x or CDM in which the number of weight vectors is x.

In addition, when new 20-port or more CSI-RS resources/patterns are designed by aggregating a plurality of (e.g., 2) CSI-RS resources/patterns in the present description, the following restrictive conditions may be applied.

For example, when a new 20-port or more CSI-RS resource/pattern is designed, only aggregation of preset resources/patterns may be permitted. In other words, aggregation in other manners (e.g., aggregation of three or more CSI-RS resources/patterns, aggregation of a plurality of CSI-RS resources/patterns having other numbers of ports, etc.) other than preset/specified/specific aggregation are not permitted. Accordingly, UE implementation complexity lower than a specific level can be ensured.

Here, when a new 20-port or more CSI-RS resource/pattern is designed by aggregating two CSI-RS resources/patterns, the following embodiments may be provided as exemplary CSI-RS resources/patterns of allowable preset/specified/specific aggregation.

(1) 20-port CSI-RS resource/pattern:
  16-port CSI-RS resource/pattern+4-port CSI-RS resource/pattern
(2) 24-port CSI-RS resource/pattern:
  12-port CSI-RS resource/pattern+12-port CSI-RS resource/pattern
  20-port CSI-RS resource/pattern+4-port CSI-RS resource/pattern
  16-port CSI-RS resource/pattern+8-port CSI-RS resource/pattern
(3) 28-port CSI-RS resource/pattern:
  12-port CSI-RS resource/pattern+16-port CSI-RS resource/pattern
  20-port CSI-RS resource/pattern+8-port CSI-RS resource/pattern
(4) 32-port CSI-RS resource/pattern:
  16-port CSI-RS resource/pattern+16-port CSI-RS resource/pattern
  20-port CSI-RS resource/pattern+12-port CSI-RS resource/pattern
  24-port CSI-RS resource/pattern+8-port CSI-RS resource/pattern
(5) 64-port CSI-RS resource/pattern:
  32-port CSI-RS resource/pattern+32-port CSI-RS resource/pattern According to the aforementioned embodiments, two separate CSI-RS resources/patterns may be aggregated to configure a new 20-port or more CSI-RS resource/pattern. However, the present invention is not limited thereto and the aforementioned embodiments can be generalized or extended and applied as embodiments in which a plurality of separate CSI-RS resources/patterns is aggregated to configure new 20-port or more CSI-RS resources/patterns.

CSI-RS resources/patterns aggregated according to the aforementioned embodiments may be positioned in the same RB, positioned in different subframes separated on the time axis or positioned in different RBs separated on the frequency axis. When embodiments in which CSI-RS resources/patterns are aggregated in a single RB are excluded, embodiments in which CSI-RS resources/patterns are aggregated in different RBs on the time axis or in different RBs on the frequency axis may include cases in which a cell reuse factor is increased or a CSI-RS resource/pattern exceeding 40 REs defined in the standards is configured.

When CSI-RS resources/patterns are aggregated in one RB, a UE expects that the aggregated CSI-RS resources/patterns do not overlap. That is, if the aggregated CSI-RS resources/patterns partially overlap, the UE can ignore the corresponding configuration by regarding the same as an error case. Here, "aggregated CSI-RS resources/patterns do not overlap" may be interpreted as "the aggregated CSI-RS resources/patterns are not transmitted through the same subframe on the time axis or through the same RB on the frequency axis".

Accordingly, specific restrictions may be applied to an eNB/network such that the eNB/network provides only CSI-RS resource/pattern configurations in which aggregated CSI-RS resources/patterns do not overlap to the UE.

Hereinafter, embodiments in which aggregated CSI-RS resources/patterns are positioned in different subframes separated on the time axis or positioned in different RBs separated on the frequency axis when two CSI-RS resources/patterns are aggregated to configure a new 20-port or more CSI-RS resource/pattern will be described in more detail. Although description focuses on cases in which two CSI-RS resources/patterns are aggregated to configure a new 20-port or more CSI-RS resource/pattern in the following embodiments for convenience of description, the present invention is not limited thereto and can be generalized as or extended and applied to embodiments in which a plurality of separate CSI-RS resources/patterns are aggregated to configure new 20-port or more CSI-RS resources/patterns.

Figure 14:
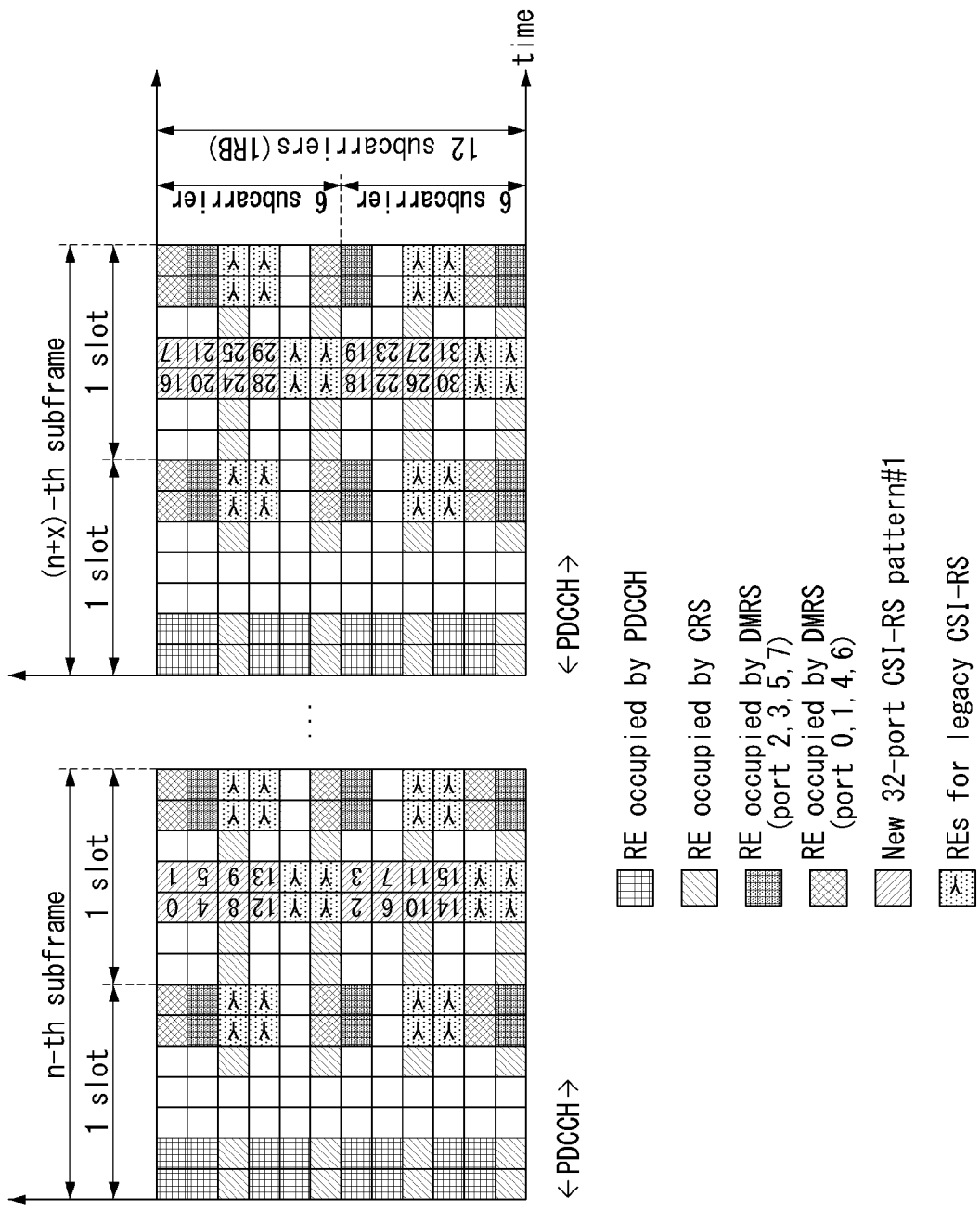
FIG. 14 illustrates a 32-port CSI-RS resource/pattern configured by aggregating two 16-port CSI-RS resources/patterns according to an embodiment of the present invention.

FIG. 14 illustrates a 32-port CSI-RS resource/pattern configured by aggregating two 16-port CSI-RS resources/patterns according to an embodiment of the present invention. In this figure, port numbers 0, 1, 2, 3, . . . are exemplary for convenience of description and may be sequentially mapped to port numbers 15, 16, 17, 18, . . .

Referring to FIG. 14, the aggregated 16-port CSI-RS resources/patterns are respectively positioned in different subframes. More specifically, the aggregated two CSI-RS resources/patterns are respectively positioned in (or mapped to) a subframe n (or n-th subframe) and a second subframe n+x (or (n+x)-th subframe) separated from the subframe n by x (x=0, 1, 2, , , ,) to configure a new 20-port or more CSI-RS resource/pattern. If the number of configured ports is 40 or less, the CSI-RS resources/patterns can be aggregated in the same subframe (i.e., x=0).

Table 5 shows CSI-RS subframe configurations in the LTE system. CSI-RS subframe configurations are defined on the basis of CSI-RS periodicity and a subframe offset. The CSI-RS periodicity can be set in units of 5, 10, 20, 40 or 80 subframes. CSI-RS resources (here, the CSI-RS resources may correspond to composite CSI-RS resources) transmitted according to time division multiplexing (TDM) may have different offset values in the present description. That is, when the 32-port CSI-RS resource is configured in the example of FIG. 14, different CSI-RS offset values may be set for the 16-port CSI-RS resource in the subframe n and the 16-port CSI-RS resource in the subframe n+x. That is, when specific composite CSI-RS resources are aggregated to configure a new CSI-RS resource/pattern, restrictions may be applied such that resources/patterns within a corresponding composite CSI-RS resource cannot be time-division-multiplexed and need to be transmitted in the same subframe.

Figure 15:
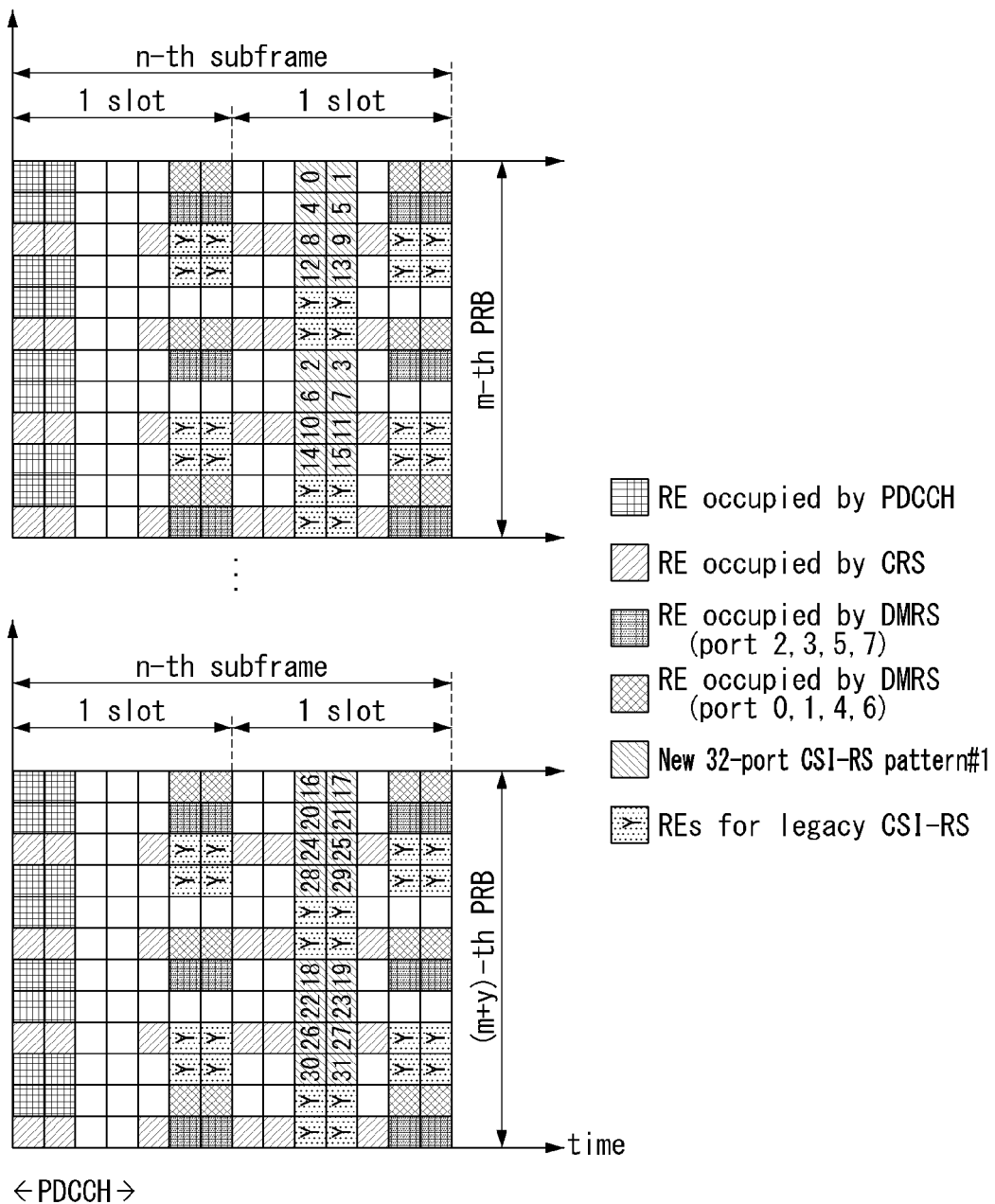
FIG. 15 illustrates a 32-port CSI-RS resource/pattern configured by aggregating two 16-port CSI-RS resources/patterns according to an embodiment of the present invention.

FIG. 15 illustrates a 32-port CSI-RS resource/pattern configured by aggregating two 16-port CSI-RS resources/patterns according to an embodiment of the present invention. In this figure, port numbers 0, 1, 2, 3, . . . are exemplary for convenience of description and may be sequentially mapped to port numbers 15, 16, 17, 18, . . . .

Referring to FIG. 15, the aggregated 16-port CSI-RS resources/patterns are positioned in different RBs in the same subframe. More specifically, the aggregated two CSI-RS resources/patterns are respectively positioned in (or mapped to) an m-th PRB in a subframe n and an (m+y)-th RB separated from the m-th PRB by y (y=0, 1, 2, , , , ) to configure a new 20-port or more CSI-RS resource/pattern. If the number of configured ports is 40 or less, the CSI-RS resources/patterns can be aggregated in the same RB (i.e., y=0).

Figure 16:
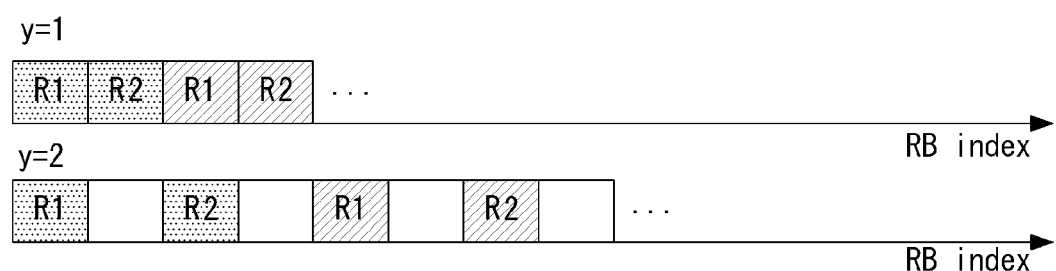
FIG. 16 illustrates an embodiment of a CSI-RS resource/pattern design using FDM according to an embodiment of the present invention.

FIG. 16 illustrates an embodiment of a CSI-RS resource/pattern design using FDM according to an embodiment of the present invention. In FIG. 16, R1 and R2 refer to different composite CSI-RS resources/patterns 1 and 2. R1 and R2 having the same pattern are aggregated to configure a new CSI-RS resource/pattern.

Referring to FIG. 16, when two aggregated CSI-RS resources/patterns are respectively positioned/mapped in/to neighboring/consecutive RBs in the same subframe (i.e., y is 1 (y=1)), two consecutive RBs are frequency-division-multiplexed (FDM) and thus consecutive 24 subcarriers can configure a new X-port (e.g., X=18) or more CSI-RS resource/pattern. Furthermore, when two aggregated CSI-RS resources/patterns are respectively positioned/mapped in/to RBs separated from each other having one RB therebetween in the same subframe (i.e., y is 2 (y=2)), two consecutive odd-numbered RBs or two consecutive even-numbered RBs may be frequency-division-multiplexed to configure a new X-port or more (e.g., X=18) CSI-RS resource/pattern.

When a composite CSI-RS resource/pattern becomes a component of a new 20-port or more CSI-RS resource/pattern in the present embodiment, restrictions may be applied such that CSI-RS resources/patterns aggregated in the composite CSI-RS resource/pattern cannot be frequency-division-multiplexed and need to be transmitted in the same RB pair.

Although not shown, aggregation of CSI-RS resources/patterns corresponding to the m-th RB in the subframe n and the (m+y)-th RB in the subframe (n+x) may also be derived/applied/considered according to a combination of the embodiments of FIGS. 14 and 15 as another embodiment.

Figure 17:
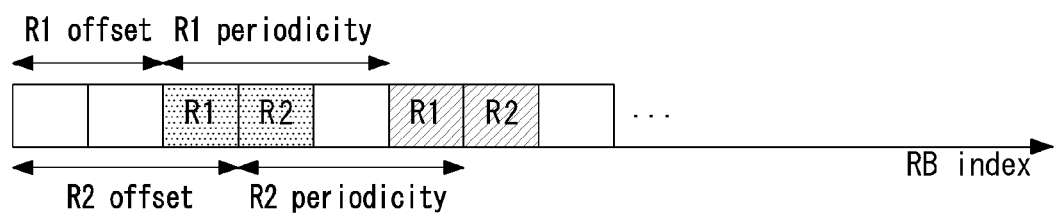
FIG. 17 illustrates an embodiment of a CSI-RS resource/pattern design using FDM according to an embodiment of the present invention.

FIG. 17 illustrates an embodiment of a CSI-RS resource/pattern design using FDM according to an embodiment of the present invention. In FIG. 16, R1 and R2 refer to different composite CSI-RS resources/patterns 1 and 2. R1 and R2 having the same pattern are aggregated to configure a new CSI-RS resource/pattern.

To configure a CSI-RS resource/pattern using FDM according to the above-described embodiment, information such as CSI-RS transmission (RB) periodicity and an RB offset for CSI-RS transmission/mapping needs to be additionally signaled to UEs through radio resource control (RRC) signaling as in TDM. To this end, when a new CSI-RS resource/pattern configured by aggregating a plurality of CSI-RS resources through FDM on the frequency axis is transmitted, each aggregated CSI-RS resource may be transmitted at a frequency spacing of 12c and may have a frequency offset set to 12d, as shown in FIG. 17, in the present description. Here, c and/or d may be set differently for aggregated CSI_RS resources. That is, c and/or d may be set differently for the aggregated CSI_RS resources, and C and/or d may not be set differently for ports in each CSI-RS resource/pattern.

In addition, when two CSI-RS resources/patterns are aggregated to configure a new CSI-RS resource/pattern, the value c associated with periodicity of RBs in/to which CSI-RSs are transmitted/mapped (referred to as "CRS-RS RB periodicity" hereinafter) may be set to a single value c to be commonly applied to the two aggregated (composite) CSI-RS resources/patterns. In this case, the value d associated with offset of RBs in/to which CSI-RSs are transmitted/mapped (referred to as "CRS-RS RB offset" hereinafter) may be individually set for respective aggregated CSI-RS resources/patterns. In other words, the periodicity of the aggregated CSI-RS resources R1 and R2 conforms to a commonly set RB periodicity, and different RB offsets (R1 offset and R2 offset) may be set for the respective aggregated resources R1 and R2. That is, only a manner in which the aggregated CSI-RS resources are frequency-division-multiplexed and transmitted at the same RB periodicity, as shown in FIG. 17, is permitted. Accordingly, respective CSI-RS resources have the same RS density.

The value c associated with CSI-RS RB periodicity and the value d associated with CSI-RS RB offset may be defined/set such that they are joint-encoded. For example, like subframeConfig which is set according to joint encoding of periodicity/offset as a time axis related configuration in the current standards, RB periodicity and/or offset may be set according to joint encoding as frequency axis related configurations to be set as a single parameter (per CSI-RS resource) such as specific RBconfig. If the value c is commonly applied to aggregated CSI-RS resources as described above, a single value of c and values of d for the respective CSI-RS resources (e.g., a single value of c and two values of d (d1 and d2)) may be defined and set to a single RBconfig parameter according to joint encoding. That is, the RBconfig parameter can be regarded as being set/defined by joint-encoding parameters of a plurality of values of d (e.g., d1 and d2).

When the above-described embodiment in which the two CSI-RS resources/patterns are aggregated to configure a new CSI-RS resource/pattern is considered, information about x and/or y may be transmitted to UEs through RRC signaling. Here, cases in which x=y=0 and x=y=1 can be implicitly recognized by UEs and thus additional RRC signaling therefor may not be required. A RE position (e.g., a RE position at which each CSI-RS resource/pattern starts) of each of aggregated CSI-RS resources/patterns may be signaled to UEs through RRC signaling per CSI-RS resource/pattern.

To reduce signaling overhead, specific configurations (e.g., the number of ports) with respect to aggregated CSI-RS resources/patterns may be limited to the same configuration. In an embodiment, the number of aggregated CSI-RS resources/patterns may be limited to a preset number such that two 16-port CSI-RS resources/patterns are aggregated/combined to generate a 32-port CSI-RS resource/pattern and two 12-port CSI-RS resources/patterns are aggregated to generate a 24-port CSI-RS resource/pattern. In addition, if aggregated CSI-RS resources/patterns are positioned in (or mapped to) different PRBs, CSI-RSs may be limited such that they are mapped to the same RE position per RB pair.

In Rel. 13, CDM-2 and CDM-4 are supported for 12-port and 16-port CSI-RS resources/patterns. When a 20-port or more CSI-RS resource/pattern proposed in the present description is configured using only 12-port or 16-port CSI-RS resources/patterns for which CDM-4 is supported, CDM-2 and CDM-4 may be extended and supported, and information about which CDM is applied may be transmitted to UEs through RRC signaling. Here, CDM-4 applied to CSI-RS resources/patterns aggregated in the present invention may differ from CDM-4 applied to 12-port and 16-port CSI-RS resources/patterns defined in Rel. 13.

In other words, CDM-4 is applied in units/form of legacy 4-port pattern in the case of the to 12-port CSI-RS resources/patterns (i.e., CDM is applied in units of two RE sets (or two RE pairs) separated from each other by six subcarriers), and CDM-4 is applied to neighboring 2-by-2 REs (REs in two columns and two rows) in the case of 16-port CSI-RS resources/patterns. Accordingly, different CDM-4s may be applied to respective resources/patterns aggregated to generate an X-port (e.g., X=18) or more CSI-RS resource/pattern in embodiments proposed in the present description.

When a 28-port CSI-RS resource/pattern is configured by aggregating a 16-port CSI-RS resource/pattern and a 12-port CSI-RS resource/pattern in an embodiment, CDM-4 is applied to neighboring 2-by-2 REs in the aggregated 16-port CSI-RS resource/pattern and CDM-4 is applied in the form of legacy 4 ports in the aggregated 12-port CSI-RS resource/pattern. A UE performs operation for realizing the same.

If CDM-4 in units/form of legacy 4 ports is applied to at least one of aggregated CSI_RS resources/patterns, CDM-4 in units/form of legacy 4 ports needs to be applied to X-port (e.g., X=18) or more CSI-RS resources/patterns generated by aggregating the corresponding CSI-RS resources/patterns. That is, restrictions may be applied to the eNB/network such that the same CDM-4 pattern is applied to aggregated CSI-RS resources/patterns when the eNB/network provides CDM related configurations to be applied to CSI-RS resources/patterns to UEs.

When the above-described embodiment is applied, only CSI-RS resources/patterns having a number of ports corresponding to a multiple of 4, for example, 20-port, 24-port, 28-port, 32-port and 64-port CSI-RS resources/patterns, can be restrictively configured. Accordingly, a method of configuring 6-port and 10-port CSI-RS resources/patterns is also proposed in order to configure CSI-RS resources/patterns having more various numbers of ports.

Figure 18:
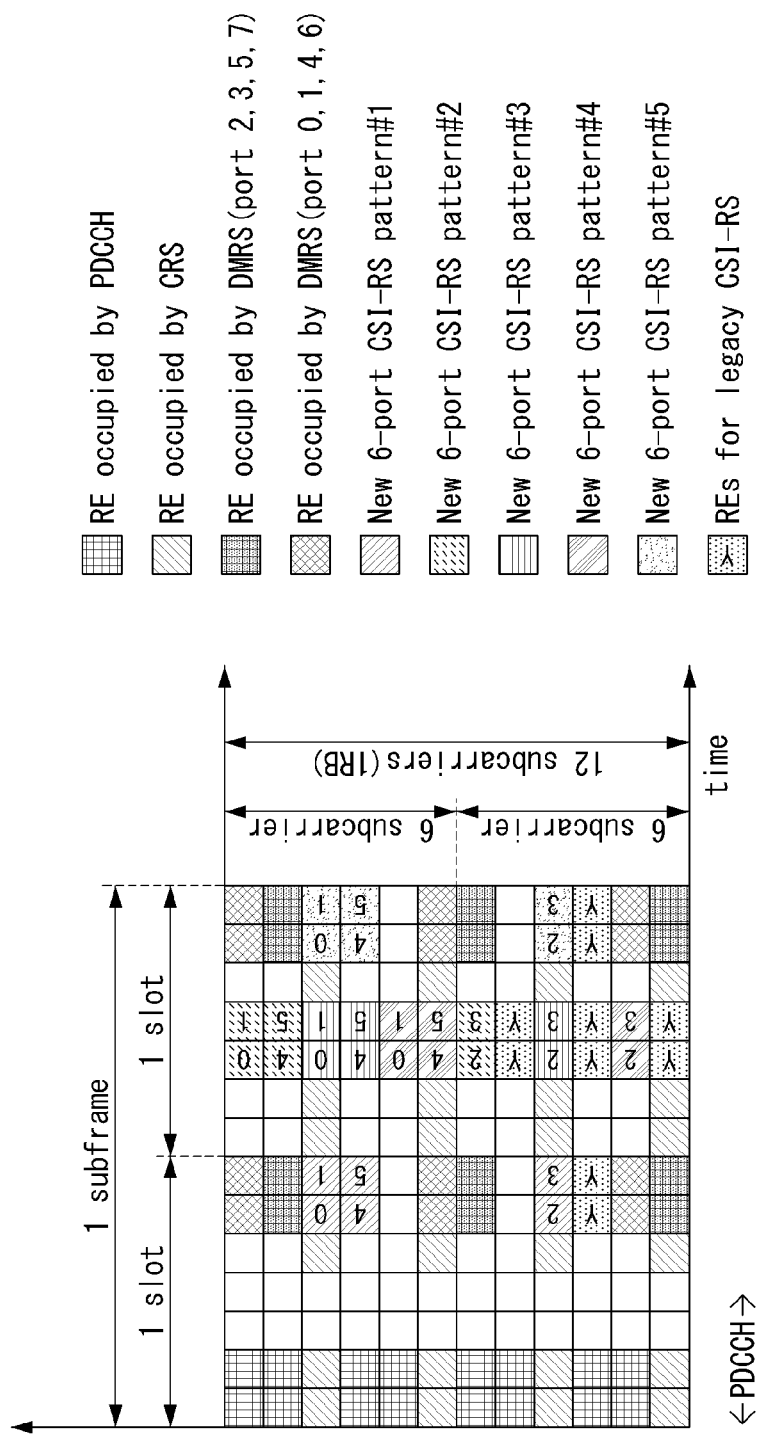
FIGS. 18 and 19 illustrate methods of configuring 6-port CSI-RS resources/patterns according to embodiments of the present invention.
Figure 19:
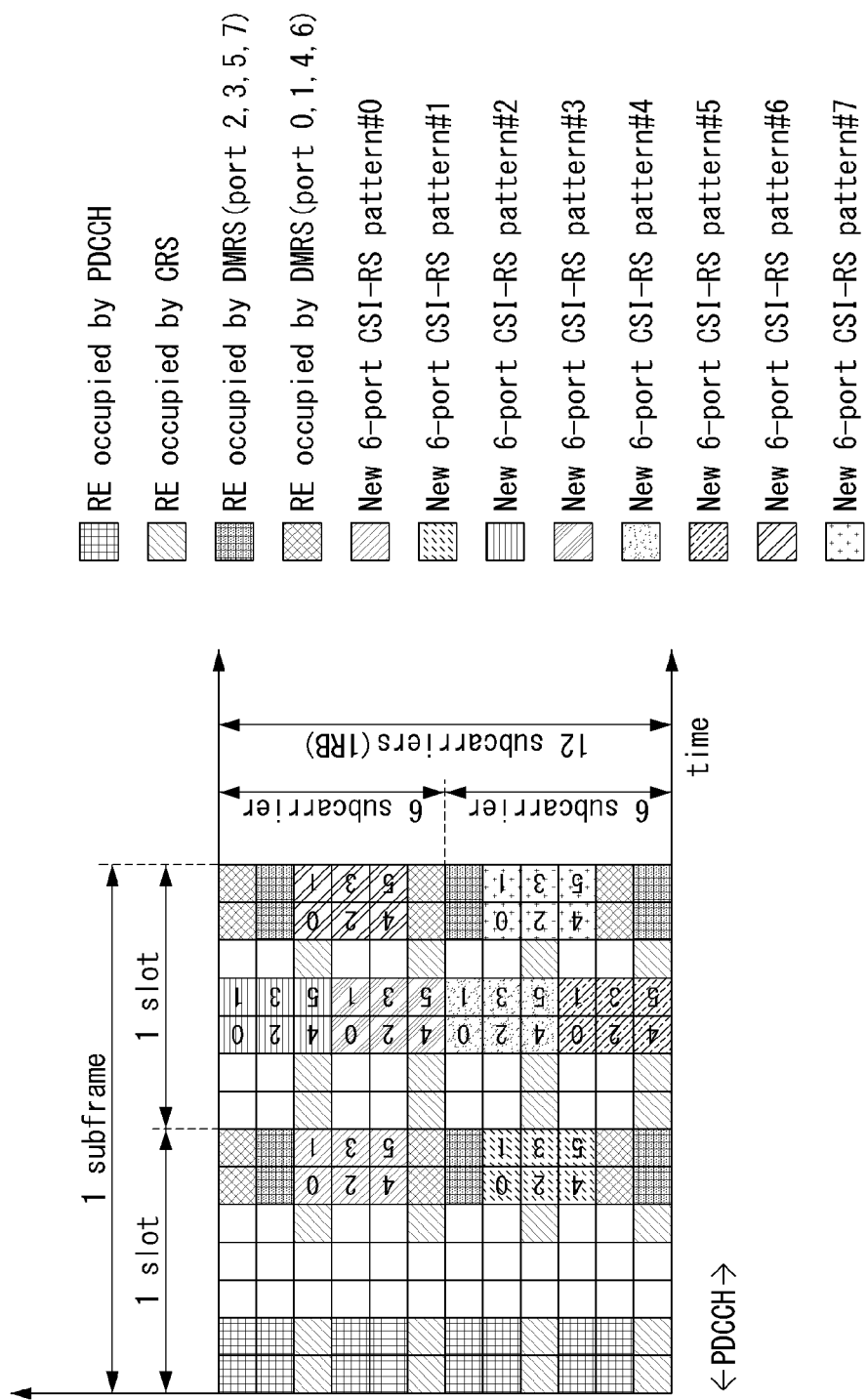

FIGS. 18 and 19 illustrate methods of configuring 6-port CSI-RS resources/patterns according to embodiments of the present invention.

Referring to FIG. 18, a 6-port CSI-RS resource/pattern may be configured as a subset of a legacy 8-port CSI-RS resource/pattern in an embodiment. That is, the embodiment illustrated in the figure is characterized in that six ports, for example, {0, 1, 2, 3, 4, 5}, {2, 3, 4, 5, 6, 7}, {0, 1, 4, 5, 6, 7} or {0, 1, 2, 3, 6, 7} are selected from legacy 8-port {0, 1, 2, 3, 4, 5, 6, 7} to configure a 6-port CSI-RS resource/pattern. Here, 6-port CSI-RS resources/patterns may be composed of the same subset or different subsets of the legacy 8-port 6-port CSI-RS resource/pattern. In the present embodiment, a 6-port CSI-RS resource/pattern is composed of a subset of the legacy 8-port CSI-RS resource/pattern and thus the cell reuse factor of the proposed 6-port CSI-RS resource/pattern design is 5.

Since the number of ports is not a multiple of 4 in the 6-port CSI-RS resource/pattern design according to the present embodiment, CDM-4 cannot be applied. Accordingly, only CDM-2 can be restrictively applied to new CSI-RS resources/patterns generated using 6-port CSI-RS resources/patterns.

Referring to FIG. 19, CSI-RS resources which have been composed of 40 REs in the past may be newly defined as CSI-RS resources composed of 48 REs. More specifically, 8 REs corresponding to port numbers {4, 5} of pattern #0, port numbers {0, 1} of pattern #1, port numbers {4, 5} of pattern #6 and port numbers {0, 1} of pattern #7 may be set as additional CSI-RS resources in addition to 40 REs defined as CSI-RS resources in the past in the present embodiment. Accordingly, a total of 48 REs can be used/set as CSI-RS resources. The 6-port CSI-RS resource design according to the present embodiment has the advantage of cell reuse factor increase to 8 compared to the embodiment shown in FIG. 18.

Application of CDM-2 to 6-port CSI-RS resource/patterns according to the present embodiment is assumed, and CDM-2 may be applied to REs corresponding to port numbers {1, 2}, {2, 3} and {4, 5} of each resource/pattern.

When a 6-port CSI-RS resource/pattern according to the present embodiment is configured for a UE through RRC signaling, a CSI-RS resource/pattern according to the CSI-RS resource/design pattern illustrated in FIG. 19 can be configured.

A 10-port CSI-RS resource/pattern may be configured by aggregating 4-port and 6-port CSI-RS resources/patterns or aggregating 2-port and 8-port CSI-RS resources/patterns. The number of ports of a 10-port CSI-RS resource/pattern is not a multiple of 4 and thus CDM-4 cannot be applied thereto. Accordingly, only CDM-2 can be restrictively applied to a new CSI-RS resource/pattern generated using a 10-port CSI-RS resource/pattern.

Embodiments of aggregating two CSI-RS resources/patterns when X-port (e.g., X=18) or more CSI-RS resources/patterns are designed have been described. However, the present invention is not limited thereto and the above-described embodiments may be extended to embodiments of designing X-port (e.g., X=18) or more CSI-RS resources/patterns by aggregating a plurality of CSI-RS resources/patterns (i.e., aggregating y CSI-RS resources/patterns (y≥2)).

When X-port (e.g., X=18) or more CSI-RS resources/patterns are configured according to the above-described embodiments, problems of unsupported full-power transmission and power imbalance between CSI-RS transport ports may still occur even when CDM-4 introduced in Rel. 13 is used. Accordingly, to solve such problems, the present description proposes CDM having a length greater than 4 to be applied to X-port (e.g., X=18) or more CSI-RS resources/patterns.

First, CDM-6 to be applied to the 6-port CSI-RS resource/pattern design illustrated in FIG. 19 is proposed. CDM-6 can be applied to the new 6-port CSI-RS resource/pattern illustrated in FIG. 19 by multiplying CSI-RSs transmitted through the new 6-port CSI-RS resource/pattern by weight vectors of Equation 14 for the respective ports. That is, CDM-6 can be applied/set by multiplying CSI-RSs mapped to six frequency-division-multiplexed CSI-RS ports {0, 1, 2, 3, 4, 5} in the CSI-RS resource/pattern illustrated in FIG. 19 by the weight vectors of Equation 14. Here, the CSI-RSs mapped to the ports {0, 1, 2, 3, 4, 5} may be sequentially multiplied by different weight vectors $W_0$ to $W_5$.

$$W_0 = [1\ 1\ 1\ 1\ 1\ 1],$$
$$W_1 = \left[1\ \exp\left(\frac{2\pi j}{6}\right)\ \exp\left(\frac{2\pi j2}{6}\right)\ \exp\left(\frac{2\pi j3}{6}\right)\ \exp\left(\frac{2\pi j4}{6}\right)\ \exp\left(\frac{2\pi j5}{6}\right)\right],$$
$$W_2 = \left[1\ \exp\left(\frac{2\pi j2}{6}\right)\ \exp\left(\frac{2\pi j4}{6}\right)\ \exp\left(\frac{2\pi j6}{6}\right)\ \exp\left(\frac{2\pi j8}{6}\right)\ \exp\left(\frac{2\pi j10}{6}\right)\right],$$
$$W_3 = \left[1\ \exp\left(\frac{2\pi j3}{6}\right)\ \exp\left(\frac{2\pi j6}{6}\right)\ \exp\left(\frac{2\pi j9}{6}\right)\ \exp\left(\frac{2\pi j12}{6}\right)\ \exp\left(\frac{2\pi j15}{6}\right)\right],$$
$$W_4 = \left[1\ \exp\left(\frac{2\pi j4}{6}\right)\ \exp\left(\frac{2\pi j8}{6}\right)\ \exp\left(\frac{2\pi j12}{6}\right)\ \exp\left(\frac{2\pi j16}{6}\right)\ \exp\left(\frac{2\pi j20}{6}\right)\right],$$
$$W_5 = \left[1\ \exp\left(\frac{2\pi j5}{6}\right)\ \exp\left(\frac{2\pi j10}{6}\right)\ \exp\left(\frac{2\pi j15}{6}\right)\ \exp\left(\frac{2\pi j20}{6}\right)\ \exp\left(\frac{2\pi j25}{6}\right)\right]$$

[Equation 14]

Equation 14 is derived from a 6×6 DFT matrix and codes are orthogonal.

When the above-described embodiment is applied, 7.8 dB can be guaranteed for CDM and power imbalance between CSI-RS transport ports can be mitigated.

Figure 20:
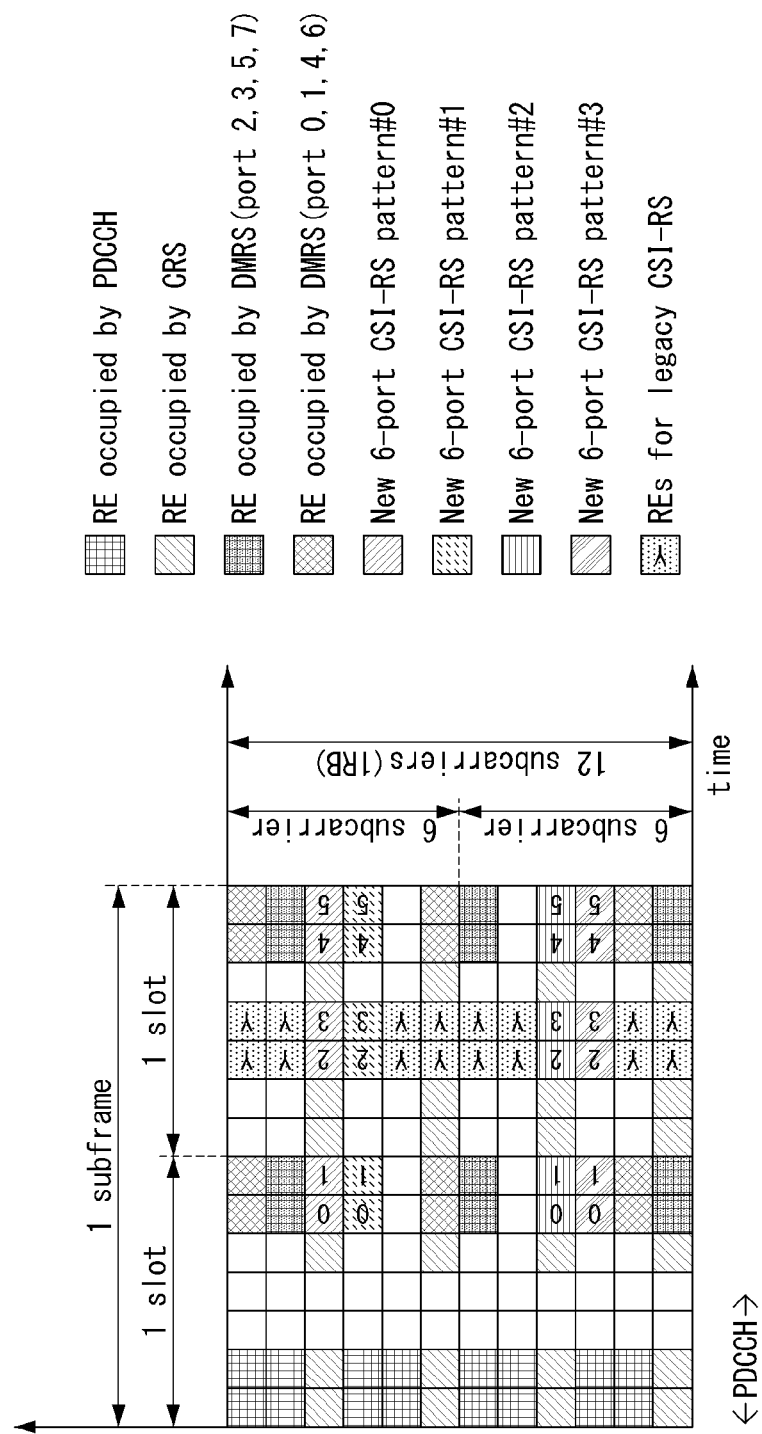
FIG. 20 illustrates an embodiment when CDM-6 is applied on the time axis according to an embodiment of the present invention.

FIG. 20 illustrates an embodiment when CDM-6 is applied on the time axis according to an embodiment of the present invention.

In a 6-port CSI-RS resource/pattern design illustrated in FIG. 20, CDM-6 can be set/applied by multiplying CI-RSs mapped to six time-division-multiplexed CSI-RS ports {0, 1, 2, 3, 4, 5} by the weight vectors of Equation 14.

In the present embodiment, when CDM is applied on the time axis, CDM is applied to a set of the same REs on the frequency axis. However, the present invention is not limited thereto, and three of legacy 2-ports respectively positioned at OFDM symbols {5, 6}, {9, 10} and {12, 13} may be selected and CDM-6 may be applied thereto (that is, CDM-6 can be applied to a set of REs positioned on the same frequency axis or different frequency axes). In this case, system flexibility can increase but performance deterioration is expected in a frequency selective environment. Accordingly, the present embodiment (i.e., time axis CDM-6 application embodiment) can be restrictively applied to REs having a difference of two subcarriers or less therebetween on the frequency axis.

Hereinafter, CDM-8 is proposed.

In the case of CDM-8, a codeword configuration may be derived from a DFT matrix or a Walsh matrix. More specifically, codewords for CDM-8 may be derived from a DFT matrix and may be configured by extending Equation 14 to an 8×8 DFT matrix. Further, codewords for CDM-8 may be derived from a Walsh matrix and weight vectors of CDM-8 are configured as represented by Equation 15.

$$W_0 = [1\ 1\ 1\ 1\ 1\ 1\ 1\ 1],$$
$$W_1 = [1\ 1\ 1\ 1\ -1\ -1\ -1\ -1],$$
$$W_2 = [1\ 1\ -1\ -1\ 1\ 1\ -1\ -1],$$
$$W_3 = [1\ 1\ -1\ -1\ -1\ -1\ 1\ 1],$$
$$W_4 = [1\ -1\ 1\ -1\ 1\ -1\ 1\ -1],$$
$$W_5 = [1\ -1\ 1\ -1\ -1\ 1\ -1\ 1],$$
$$W_6 = [1\ -1\ -1\ 1\ 1\ -1\ -1\ 1],$$
$$W_7 = [1\ -1\ -1\ 1\ -1\ 1\ 1\ -1],$$

【Equation 15】

Figure 21:
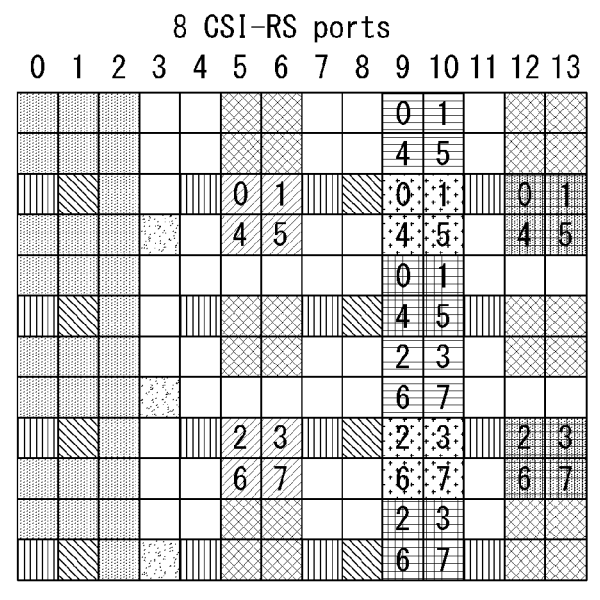

FIG. 21 illustrates five legacy CSI-RS configurations which can be used by eight CSI-RS antenna ports for CSI-RS transmission. Description of FIG. 21 is the same as description of FIG. 8(c).

CDM-8 can be applied/set by sequentially multiplying CSI-RSs mapped to CSI-RS ports {0, 1, 2, 3, 4, 5, 6, 7} in the 8-port CSI-RS resource pattern shown in the figure by weight vectors of Equation 15. As another example of applying/embodying CDM-8, CDM-8 may be applied/set by sequentially multiplying CSI-RSs mapped to ports in the order of {0, 1, 4, 5, 2, 3, 6, 7} in the 8-port CSI-RS resource pattern shown in the figure by the weight vectors of Equation 15.

Figure 22:
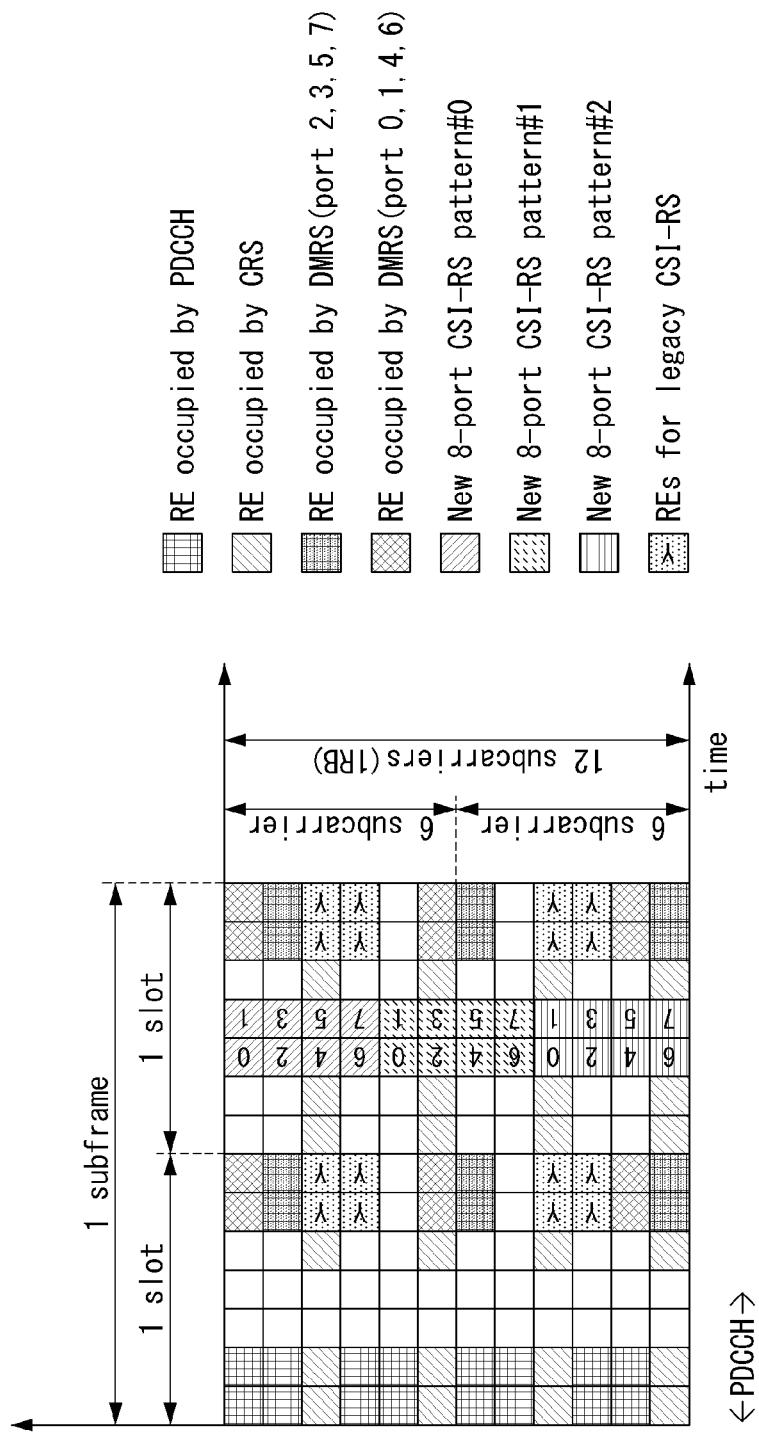
FIGS. 22 to 24 illustrate 8-port CSI-RS resource/pattern designs to which CDM-8 is applied according to embodiments of the present invention.
Figure 23:
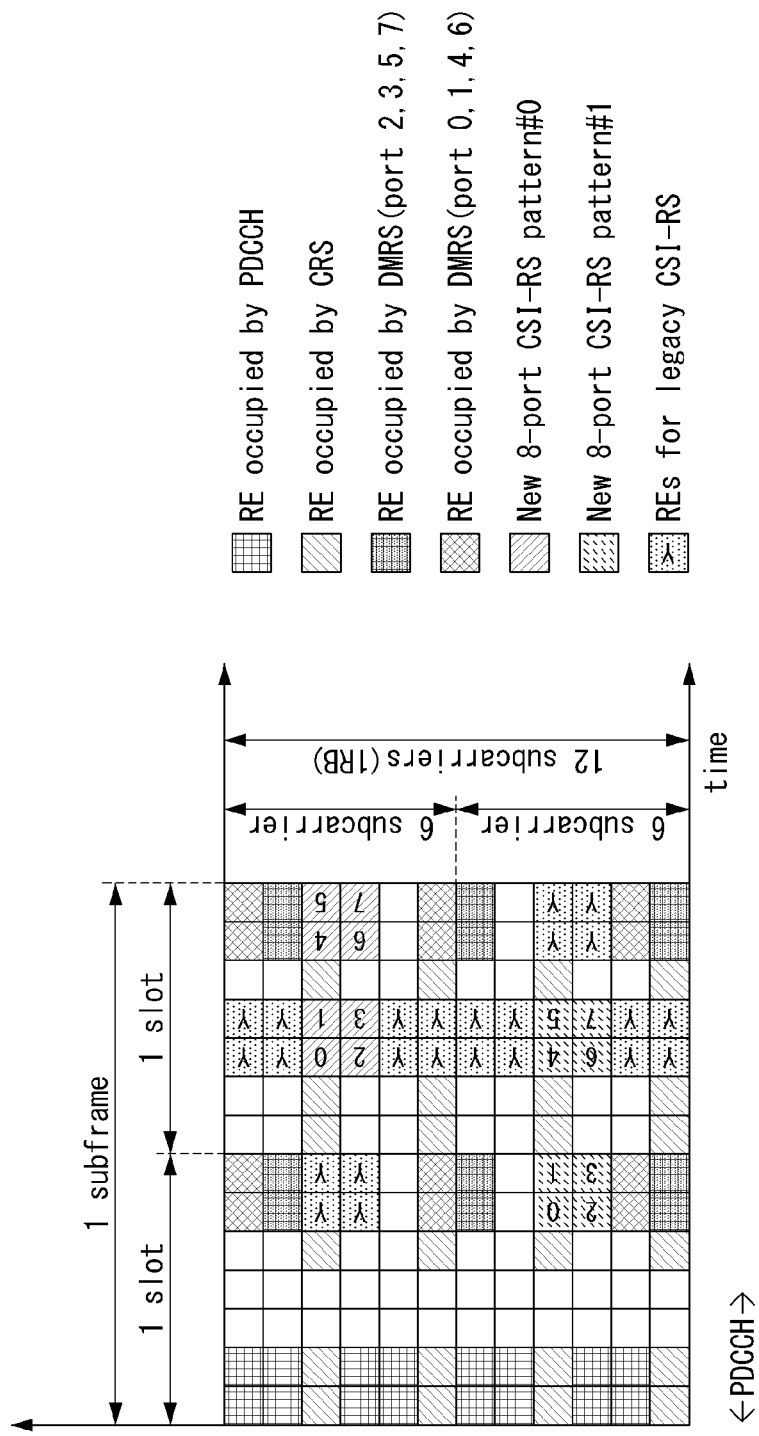
Figure 24:
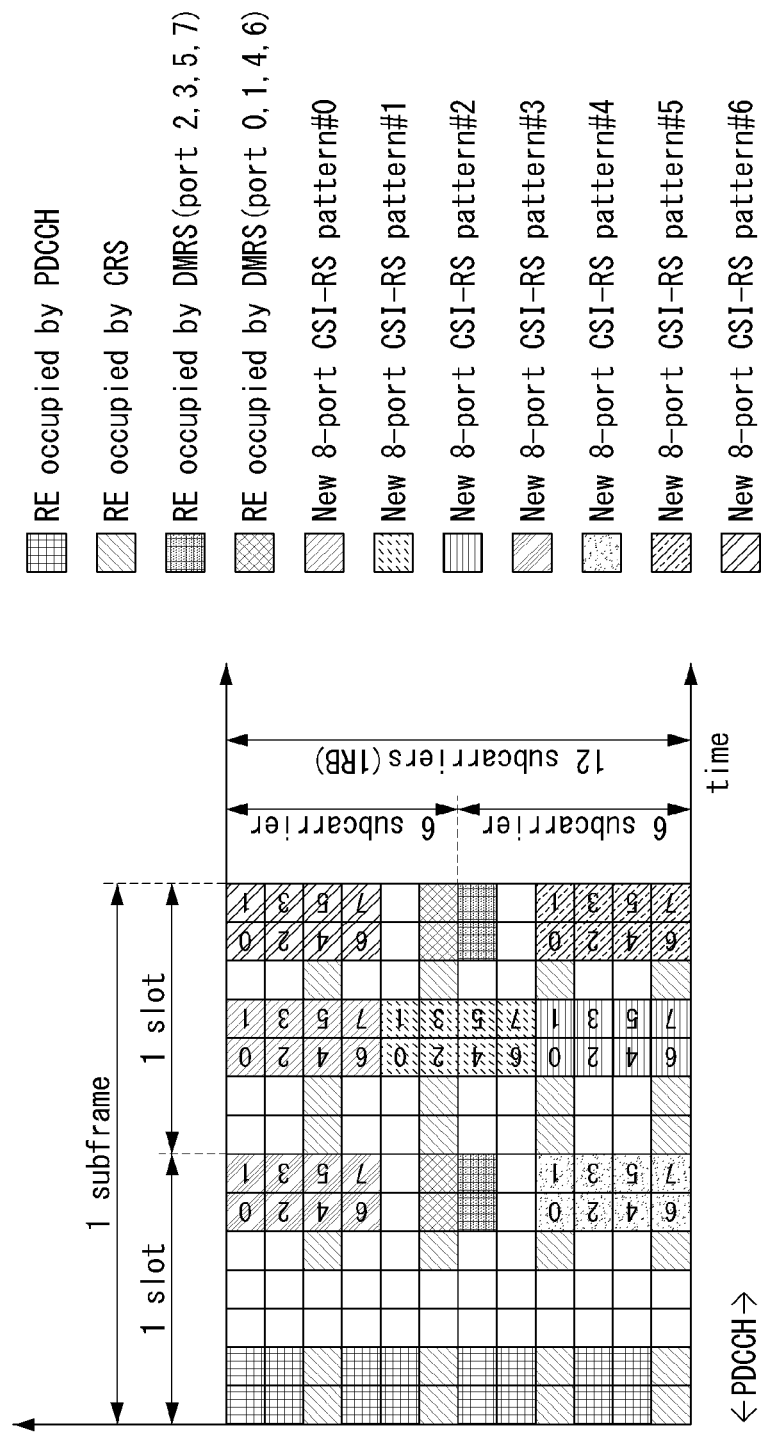

FIGS. 22 to 24 illustrate 8-port CSI-RS resource/pattern designs to which CDM-8 is applied according to embodiments of the present invention.

In the case of an 8-port CSI-RS resource/pattern according to the embodiment of FIG. 22, higher performance in a frequency selective channel is expected because REs to which CDM-8 is applied are arranged more densely on the frequency axis than in the legacy 8-port CSI-RS resource/pattern shown in FIG. 21.

FIG. 23 illustrates an embodiment in which CDM-8 is applied to CSI-RSs mapped to eight REs present over two subcarriers and four OFDM symbols. In the embodiment of FIG. 23, REs are arranged on the time axis more densely in 8-port CSI-RS resource/pattern #0 than in pattern #1, and thus performance more robust to phase drift is expected.

The embodiments illustrated in FIGS. 22 and 23 are characterized in that two port groups {0,1,2,3} and {4,5,6,7} are respectively mapped to two RE groups each of which is composed of four REs disposed in a 2×2 form on the time and frequency axes. These embodiments may be understood as embodiments in which CSI-RS resources/patterns are designed in higher density on the time axis and/or frequency axis in order to obtain higher performance in environments in which channels severely change. That is, a CSI-RS resource/pattern may be designed such that an OFDM symbol spacing between two port groups is a maximum of two symbols and a subcarrier spacing is not set (e.g., two port groups are positioned/mapped on/to four consecutive subcarriers or positioned/mapped on/to the same subcarrier) in each embodiment.

FIG. 24 illustrates a method of designing an 8-port CSI-RS pattern/resource using a maximum of 56 REs by allocating REs which can be allocated for DM-RS transmission (or REs which can be allocated for data transmission) for CSI-RS transmission.

The 8-port CSI-RS pattern/resource shown in FIG. 24 has the advantage of a large cell reuse factor of 7 compared to the 8-port CSI-RS pattern/resource shown in FIG. 22.

Meanwhile, three 8-port CSI-RS resources/patterns shown in FIG. 22 may be aggregated to configure a single 24-port CSI-RS resource/pattern. More specifically, a 24-port CSI-RS resource/pattern may be configured by aggregating three 8-port CSI-RS resources/patterns which are positioned at OFDM symbols #9 (or #10) and #10 (or #11) on the time axis in a single subframe and are neighbor/contiguous on the frequency axis, as shown in FIG. 22.

For example, the 24-port CSI-RS resource pattern may be configured using first to third 8-port CSI-RS resources/patterns. The first to third 8-port CSI-RS resources/patterns may be positioned at two OFDM symbols (OFDM symbols #9/#10 and #10/#11) and four consecutive subcarriers in a single subframe.

Here, the first 8-port CSI-RS resource/pattern may be positioned at OFDM symbols #9/#10 and #10/#11 and subcarrier regions #11/#1 to #8/#4 in a single subframe. Specific coordinates of the first 8-port CSI-RS resource/pattern may be represented as (11, 2), (11, 3), (10, 2), (10, 3), (9, 2), (9, 3), (8, 2) and (8, 3) of the second slot in the subframe using (k', 1') (k' denoting a subcarrier index in a resource block and 1' denoting an OFDM symbol index in a slot) described above with respect to FIG. 8.

Similarly, the second 8-port CSI-RS resource/pattern may be positioned at OFDM symbols #9/#10 and #10/#11 and subcarrier regions #7/#5 to #4/#8 in a single subframe. Specific coordinates of the second 8-port CSI-RS resource/pattern may be represented as (7, 2), (7, 3), (6, 2), (6, 3), (5, 2), (5, 3), (4, 2) and (4, 3) of the second slot in the subframe using (k', 1') described above with respect to FIG. 8.

Similarly, the third 8-port CSI-RS resource/pattern may be positioned at OFDM symbols #9/#10 and #10/#11 and subcarrier regions #3/#9 to #0/#12 in a single subframe. Specific coordinates of the third 8-port CSI-RS resource/pattern may be represented as (3, 2), (3, 3), (2, 2), (2, 3), (1, 2), (1, 3), (0, 2) and (0, 3) of the second slot in the subframe using (k', 1') described above with respect to FIG. 8.

Here, CDM-8 can be applied to CSI-RSs mapped to the first to third 8-port CSI-RS resources/pattern, as described above.

Hereinafter, CDM-16 is proposed.

Weight vectors of CDM-16 may also be derived from a Walsh matrix similarly to CDM-8. That is, the weight vectors may be derived from a 16×16 Walsh matrix as represented by Equation 16.

$$W_0=[1\ 1\ 1\ 1\ 1\ 1\ 1\ 1\ 1\ 1\ 1\ 1\ 1\ 1\ 1\ 1],$$
$$W_1=[1\ -1\ 1\ -1\ 1\ -1\ 1\ -1\ 1\ -1\ 1\ -1\ 1\ -1\ 1\ -1],$$
$$W_2=[1\ 1\ -1\ -1\ 1\ 1\ -1\ -1\ 1\ 1\ -1\ -1\ 1\ 1\ -1\ -1],$$
$$W_3=[1\ -1\ -1\ 1\ 1\ -1\ -1\ 1\ 1\ -1\ -1\ 1\ 1\ -1\ -1\ 1],$$
$$W_4=[1\ 1\ 1\ 1\ -1\ -1\ -1\ -1\ 1\ 1\ 1\ 1\ -1\ -1\ -1\ -1],$$
$$W_5=[1\ -1\ 1\ -1\ -1\ 1\ -1\ 1\ 1\ -1\ 1\ -1\ -1\ 1\ -1\ 1],$$
$$W_6=[1\ 1\ -1\ -1\ -1\ -1\ 1\ 1\ 1\ 1\ -1\ -1\ -1\ -1\ 1\ 1],$$
$$W_7=[1\ -1\ -1\ 1\ -1\ 1\ 1\ -1\ 1\ -1\ -1\ 1\ -1\ 1\ 1\ -1],$$
$$W_8=[1\ 1\ 1\ 1\ 1\ 1\ 1\ 1\ -1\ -1\ -1\ -1\ -1\ -1\ -1\ -1],$$
$$W_9=[1\ -1\ 1\ -1\ 1\ -1\ 1\ -1\ -1\ 1\ -1\ 1\ -1\ 1\ -1\ 1],$$
$$W_{10}=[1\ 1\ -1\ -1\ 1\ 1\ -1\ -1\ -1\ -1\ 1\ 1\ -1\ -1\ 1\ 1],$$
$$W_{11}=[1\ -1\ -1\ 1\ 1\ -1\ -1\ 1\ -1\ 1\ 1\ -1\ -1\ 1\ 1\ -1],$$
$$W_{12}=[1\ 1\ 1\ 1\ -1\ -1\ -1\ -1\ -1\ -1\ -1\ -1\ 1\ 1\ 1\ 1],$$
$$W_{13}=[1\ -1\ 1\ -1\ -1\ 1\ -1\ 1\ -1\ 1\ -1\ 1\ 1\ -1\ 1\ -1],$$
$$W_{14}=[1\ 1\ -1\ -1\ -1\ -1\ 1\ 1\ -1\ -1\ 1\ 1\ 1\ 1\ -1\ -1],$$
$$W_{15}=[1\ -1\ -1\ 1\ -1\ 1\ 1\ -1\ -1\ 1\ 1\ -1\ 1\ -1\ -1\ 1]$$

【Equation 16】

CDM-16 proposed in the present description can be applied to a 16-port CSI-RS resource/pattern configured by aggregating two 8-port CSI-RS resources/patterns to which CDM-8 described above is applied.

For example, a single 16-port CSI-RS resource/pattern can be configured by aggregating two of the legacy 8-port CSI-RS resources/patterns as shown in FIG. 21, and CDM-16 can be applied to the configured resource/pattern. Here, two aggregated CSI-RS resources/patterns may be sequentially numbered as {0, 1, 2, 3, 4, 5, 6, 7} and {8, 9, 10, 11, 12, 13, 14, 15} and CDM-16 may be applied thereto or may be numbered as {0, 1, 4, 5, 2, 3, 6, 7} and {0, 1, 4, 5, 2, 3, 6, 7}+8 and CDM-16 may be applied thereto.

That is, when CDM-16 is applied, the former refers to a method of performing sequential port numbering in units of legacy 8 ports and the latter refers to a method of performing port numbering in units of 2×2 REs like 16-port CDM-4 of Rel. 13.

In addition, the CDM-8 related embodiments described above with reference to FIGS. 22 to 24 may be combined as described above and extended to and applied as CDM-16 related embodiments.

Hereinafter, CDM-12 and CDM-20 are proposed.

A DFT matrix is used when CDM-x which does not correspond to an exponent of 2 is applied, as described above. This is because there is no Walsh matrix composed of binary numbers (1 or −1). However, even when x=12 or 20, a binary orthogonal matrix composed of 1 and −1 can be configured using Paley construction when a Hadamard matrix is configured. This can reduce complexity because CDM weight vectors are generated using integers, compared to cases in which an orthogonal matrix is configured using DFT. Paley construction is a method of configuring a Hadamard matrix using finite fields and uses a quadratic residue of GF(q). Here, q is a prime and an odd number. In this case, a Hadamard matrix of (q+1) may be configured as represented by Equation 17.

$$H = I + \begin{bmatrix} 0 & 1^T \\ -1^T & Q \end{bmatrix}$$

Here, I represents a (q+1)×(q+1) identity matrix, 1 represents a q-length vector composed of 1 and Q represents a q×q Jacobsthal matrix in which a row a and column b are composed of $\chi(a-b)$, $\chi(a)$ indicates whether a finite field element a is a perfect square. For example, $\chi(a)=1$ if $a=b^2$ for any non-zero finite field element b, and $\chi(a)=-1$ if not (e.g., if a cannot be represented by a square). Based on this, weight vectors of CDM-12 may be derived as represented by Equation 18.

$W_0=[1\ 1\ 1\ 1\ 1\ 1\ 1\ 1\ 1\ 1\ 1\ 1]$, $W_1=[1\ -1\ 1\ -1\ 1\ 1\ 1\ -1\ -1\ -1\ 1\ -1]$, $W_2=[1\ -1\ -1\ 1\ -1\ 1\ 1\ 1\ -1\ -1\ -1\ 1]$, $W_3=[1\ 1\ -1\ -1\ 1\ -1\ 1\ 1\ 1\ -1\ -1\ -1]$, $W_4=[1\ -1\ 1\ -1\ -1\ 1\ -1\ 1\ 1\ 1\ -1\ -1]$, $W_5=[1\ -1\ -1\ 1\ -1\ -1\ 1\ -1\ 1\ 1\ 1\ -1]$, $W_6=[1\ -1\ -1\ -1\ 1\ -1\ -1\ 1\ -1\ 1\ 1\ 1]$, $W_7=[1\ 1\ -1\ -1\ -1\ 1\ -1\ -1\ 1\ -1\ 1\ 1]$, $W_8=[1\ 1\ 1\ -1\ -1\ -1\ 1\ -1\ -1\ 1\ -1\ 1]$, $W_9=[1\ 1\ 1\ 1\ -1\ -1\ -1\ 1\ -1\ -1\ 1\ -1]$, $W_{10}=[1\ -1\ 1\ 1\ 1\ -1\ -1\ -1\ 1\ -1\ -1\ 1]$, $W_{11}=[1\ 1\ -1\ 1\ 1\ 1\ -1\ -1\ -1\ 1\ -1\ -1]$,

[Equation 18]

CDM-12 proposed in the present description can be applied to a single 12-port CSI-RS resource/pattern configured by aggregating two 6-port CSI-RS resources/patterns to which CDM-6 described above is applied.

For example, a single 12-port CSI-RS resource/pattern may be configured by aggregating two 6-port CSI-RS resources/patterns as shown in FIG. 19 and CDM-16 may be applied thereto using Equation 18. Here, the two aggregated CSI-RS resources/patterns may be sequentially numbered as {0, 1, 2, 3, 4, 5} and {8, 9, 10, 11, 12, 13} and CDM-12 may be applied thereto.

In addition, the CDM-6 related embodiments described above with reference to FIGS. 18 to 20 may be combined as described above and extended to and applied as CDM-12 related embodiments.

Weight vectors of CDM-20 may be generated using Equation 19.

$W_0=[1\ 1\ 1\ 1\ 1\ 1\ 1\ 1\ 1\ 1\ 1\ 1\ 1\ 1\ 1\ 1\ 1\ 1\ 1\ 1]$, $W_1=[1\ -1\ -1\ 1\ 1\ -1\ -1\ -1\ -1\ 1\ 1\ -1\ 1\ -1\ 1\ 1\ 1\ 1\ -1\ -1\ 1]$, $W_2=[1\ -1\ 1\ 1\ -1\ -1\ -1\ -1\ 1\ 1\ -1\ 1\ -1\ 1\ 1\ 1\ 1\ -1\ -1\ 1\ -1]$, $W_3=[1\ 1\ 1\ -1\ -1\ -1\ -1\ 1\ 1\ -1\ 1\ -1\ 1\ 1\ 1\ 1\ -1\ -1\ 1\ -1\ -1]$, $W_4=[1\ 1\ -1\ -1\ -1\ -1\ 1\ 1\ -1\ 1\ -1\ 1\ 1\ 1\ 1\ -1\ -1\ 1\ -1\ -1\ 1\ -1]$, $W_5=[1\ -1\ -1\ -1\ -1\ 1\ 1\ -1\ 1\ -1\ 1\ 1\ 1\ 1\ -1\ -1\ 1\ -1\ -1\ 1\ 1\ 1]$, $W_6=[1\ -1\ -1\ -1\ 1\ 1\ -1\ 1\ -1\ 1\ 1\ 1\ 1\ -1\ -1\ 1\ -1\ -1\ 1\ 1\ 1\ -1]$, $W_7=[1\ -1\ -1\ 1\ 1\ -1\ 1\ -1\ 1\ 1\ 1\ 1\ -1\ -1\ 1\ -1\ -1\ 1\ 1\ -1\ -1\ -1]$, $W_8=[1\ -1\ 1\ 1\ -1\ 1\ -1\ 1\ 1\ 1\ 1\ -1\ -1\ 1\ -1\ -1\ 1\ 1\ -1\ -1\ -1]$, $W_9=[1\ 1\ -1\ 1\ -1\ 1\ 1\ 1\ 1\ -1\ -1\ 1\ -1\ -1\ 1\ 1\ -1\ -1\ -1\ -1\ -1]$, $W_{10}=[1\ -1\ 1\ -1\ 1\ 1\ 1\ 1\ -1\ -1\ 1\ -1\ -1\ 1\ 1\ -1\ -1\ -1\ -1\ 1\ -1\ 1]$, $W_{11}=[1\ 1\ -1\ 1\ 1\ 1\ 1\ -1\ -1\ 1\ -1\ -1\ 1\ 1\ -1\ -1\ -1\ -1\ 1\ -1\ 1\ -1]$, $W_{12}=[1\ -1\ 1\ 1\ 1\ 1\ -1\ -1\ 1\ -1\ -1\ 1\ 1\ -1\ -1\ -1\ -1\ 1\ -1\ 1\ -1\ 1]$, $W_{13}=[1\ 1\ 1\ 1\ 1\ -1\ -1\ 1\ -1\ -1\ 1\ 1\ -1\ -1\ -1\ -1\ 1\ -1\ 1\ -1\ 1\ 1\ -1]$, $W_{14}=[1\ 1\ 1\ 1\ -1\ -1\ 1\ 1\ -1\ -1\ 1\ 1\ -1\ -1\ -1\ -1\ 1\ -1\ 1\ -1\ 1\ -1\ 1]$, $W_{15}=[1\ 1\ 1\ -1\ -1\ 1\ -1\ -1\ 1\ 1\ -1\ -1\ -1\ -1\ 1\ -1\ 1\ -1\ 1\ 1\ -1\ 1\ 1]$, $W_{16}=[1\ 1\ -1\ -1\ 1\ -1\ -1\ 1\ 1\ -1\ -1\ -1\ -1\ 1\ -1\ 1\ -1\ 1\ 1\ -1\ 1\ 1\ 1]$, $W_{17}=[1\ -1\ -1\ 1\ -1\ -1\ 1\ 1\ -1\ -1\ -1\ -1\ 1\ -1\ 1\ -1\ 1\ 1\ -1\ 1\ 1\ 1\ 1]$, $W_{18}=[1\ -1\ 1\ -1\ -1\ 1\ 1\ -1\ -1\ -1\ -1\ 1\ -1\ 1\ -1\ 1\ 1\ -1\ 1\ 1\ 1\ 1\ 1]$, $W_{19}=[1\ 1\ -1\ -1\ 1\ 1\ -1\ -1\ -1\ -1\ 1\ -1\ 1\ -1\ 1\ 1\ -1\ 1\ 1\ 1\ 1\ -1\ -1]$,

[Equation 19]

The weight vectors of Equation 19 may be applied to 20-port CSI-RS resources/patterns configured according to the embodiments proposed in the present description. Aggregated resources/patterns may be sequentially port-numbered and CDM-20 may be applied thereto.

Although the present description proposes a method of configuring CDM-12 and CDM-20 using Paley construction, the method may be extended to a method of using a DFT matrix used to configure CDM-6.

Figure 25:
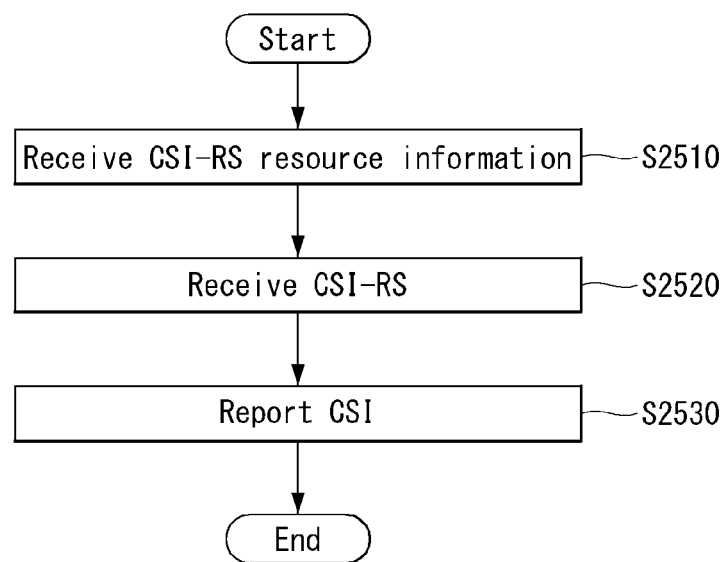
FIG. 25 is a flowchart illustrating a CSI reporting method of a UE according to an embodiment of the present invention.

FIG. 25 is a flowchart illustrating a CSI reporting method of a UE according to an embodiment of the present invention. The above-described embodiments and description may be equally/similarly applied to the flowchart and redundant description will be omitted.

First, a UE may receive, from an eNB, CSI-RS resource information about a CSI-RS resource to which a CSI-RS is mapped (S2510).

Here, the CSI-RS resource may be configured by aggregating a plurality of CSI-RS resources, and the aggregated CSI-RS resources may be respectively positioned in different subframes on the time axis or in different resource blocks on the frequency axis. Here, at least one of the aggregated CSI-RS resources may correspond to a composite CSI-RS resource configured by aggregating a plurality of legacy CSI-RS resources. The plurality of legacy CSI-RS resources which constitutes the composite CSI-RS resource may be limited to CSI-RS resources having the same number of ports. And/or the CSI-RS resource may be limited such that it is configured by aggregating CSI-RS resources of a predefined number of ports.

In addition, the different subframes in which the aggregated CSI-RS resources are positioned may have different CSI-RS subframe offsets. Further, when the aggregated CSI-RS resources are respectively positioned in different subframes having a spacing of a preset number of subframes therebetween, information on the spacing of the preset number of subframes may be transmitted to the UE through radio resource control (RRC) signaling. Furthermore, when the aggregated CSI-RS resources are respectively positioned in different subframes on the time axis, the aggregated CSI-RS resources may be mapped to the same subcarriers in the different subframes.

If the aggregated CSI-RS resources are respectively positioned in different resource blocks having a spacing of a preset number of resources blocks therebetween, information on the spacing of the preset number of resource blocks may be transmitted to the UE through RRC signaling. In addition, the different resource blocks in which the aggregated CSI-RS resources are positioned may have the same transmission periodicity for the aggregated CSI-RS resources, and the different resource blocks may have different resource block offsets for the aggregated CSI-RS resources. Here, the transmission periodicity and resource block offsets may be joint-encoded and transmitted to the UE.

Furthermore, when at least one of the aggregated CSI-RS resources corresponds to a 12-port CSI-RS resource or a 16-port CSI-RS resource, code division multiplexing (CDM) in which the number of orthogonal weight vectors is 2 or 4 may be applied to the CSI-RS mapped to the 12-port CSI-RS resource or the 16-port CSI-RS resource.

Subsequently, the UE may receive a CSI-RS transmitted through one or more antenna ports from the eNB on the basis of the received CSI-RS resource information (S2520).

Finally, the UE may generate CSI on the basis of the received CSI-RS and report the generated CSI to the eNB (S2530).

CDM in which the number of orthogonal weight vectors is 6, 8, 12, 8 or 20 may be applied to the CSI-RS depending on the number of ports of each of the CSI-RS resources aggregated into the CSI-RS resource to which the CSI-RS is mapped.

General Apparatus to which Present Invention is Applicable

Figure 26:
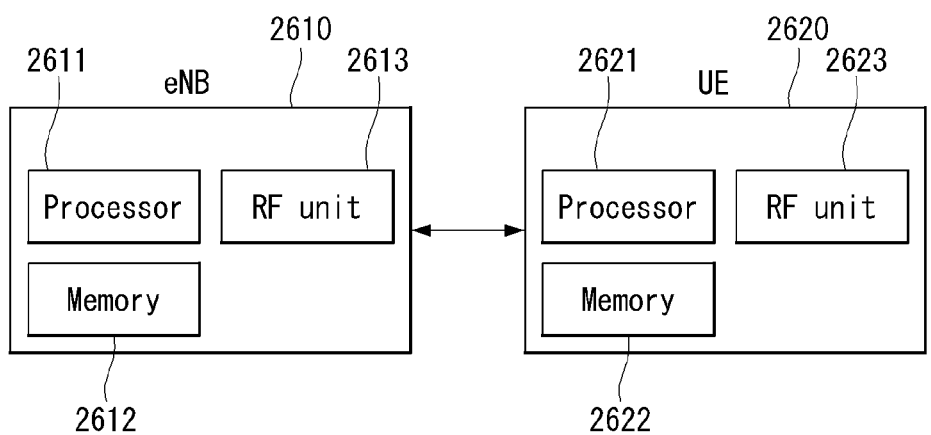
FIG. 26 is a block diagram of a wireless communication apparatus according to an embodiment of the present invention.

FIG. 26 is a block diagram of a wireless communication apparatus according to an embodiment of the present invention.

Referring to FIG. 26, the wireless communication system includes an eNB 2610 and a plurality of UEs 2620 located within the area of the eNB 2610.

The eNB 2610 includes a processor 2611, a memory 2612, and a radio frequency (RF) unit 2613. The processor 2611 implements the functions, processes and/or methods proposed in FIGS. 1 to 22. The layers of a wireless interface protocol may be implemented by the processor 2611. The memory 2612 is connected to the processor 2611 and stores various pieces of information for driving the processor 2611. The RF unit 2613 is connected to the processor 2611 and transmits and/or receives a radio signal.

The UE 2620 includes a processor 2621, memory 2622, and an RF unit 2623. The processor 2621 implements the functions, processes and/or methods proposed in FIGS. 1 to 22. The layers of a wireless interface protocol may be implemented by the processor 2621. The memory 2622 is connected to the processor 2621 and stores various pieces of information for driving the processor 2621. The RF unit 2623 is connected to the processor 2621 and transmits and/or receives a radio signal.

The memories 2612 and 2322 may be inside or outside the processors 2611 and 2621 and connected to the processors 2611 and 2621 by various well-known means. Furthermore, the eNB 2610 and/or the UE 2620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various modes for carrying out the invention have been described in the best mode for carrying the invention.

INDUSTRIAL APPLICABILITY

Although the present invention has been described with reference to examples applied to the 3GPP LTE/LTE-A system, it is applicable to various wireless communication systems other than the 3GPP LTE/LTE-A system.

The invention claimed is:

1. A method for reporting channel state information (CSI) of a user equipment (UE) in a wireless communication system, comprising:
   receiving, from an eNB, CSI-RS (CSI-reference signal) resource information related to a plurality of CSI-RS resources corresponding to a 24-port CSI-RS resource comprising an aggregation of first to third 8-port CSI-RS resources,
   the first to third 8-port CSI-RS resources being located in third and fourth OFDM symbol regions of a second slot in a single subframe on the time axis,
   the first 8-port CSI-RS resource being located in first to fourth subcarrier regions on the frequency axis,
   the second 8-port CSI-RS resource is located in fifth to eighth subcarrier regions on the frequency axis, and
   the third 8-port CSI-RS resource is located in ninth to twelfth subcarrier regions on the frequency axis;
   receiving, from the eNB, a plurality of CSI-RSs mapped to the plurality of aggregated first to third 8-port CSI-RS resources, based on the received CSI-RS resource information; and
   reporting, to the eNB, CSI generated based on the plurality of CSI-RSs.

2. The method of claim 1, wherein at least one of the aggregated CSI-RS resources corresponds to a composite CSI-RS resource configured by aggregating a plurality of legacy CSI-RS resources.

3. The method of claim 2, wherein the plurality of legacy CSI-RS resources constituting the composite CSI-RS resource is limited to CSI-RS resources of the same number of ports.

4. The method of claim 1, wherein the CSI-RS resource is limited such that the CSI-RS is configured by aggregating CSI-RS resources of a predefined number of ports.

5. The method of claim 1, wherein the different subframes in which the aggregated CSI-RS resources are positioned have different CSI-RS subframe offsets.

6. The method of claim 5 further comprising:
   based on the aggregated CSI-RS resources being respectively positioned in the different subframes having a spacing of a predetermined number of subframes there between, receiving, from the eNB, information related to the spacing of the predetermined number of subframes through radio resource control (RRC) signaling.

7. The method of claim 5, wherein, based on the aggregated CSI-RS resources being respectively positioned in different subframes on the time axis, the aggregated CSI-RS resources are mapped to the same subcarriers in the different subframes.

8. The method of claim 1 further comprising:
   based on the aggregated CSI-RS resources being respectively positioned in different resource blocks having a spacing of a predetermined number of resources blocks there between, receiving, from the eNB, information related to the spacing of the predetermined number of resource blocks through RRC signaling.

9. The method of claim 1, wherein a transmission periodicity of different resource blocks in which the aggregated CSI-RS resources are positioned is set to be the same for each of the aggregated CSI-RS resources, and a resource block offset of the different resource blocks is set differently for each of the aggregated CSI-RS resources.

10. The method of claim 9, wherein the transmission periodicity and the resource block offset are joint-encoded and transmitted to the UE.

11. The method of claim 1, wherein the plurality of CSI-RSs are applied with code division multiplexing (CDM) in which a number of orthogonal weight vectors is 6, 8, 12, 16 or 20 according to the number of ports of each of the plurality of CSI-RS resources aggregated into the plurality of CSI-RS resources to which the plurality of CSI-RSs are mapped.

12. The method of claim 1, wherein CSI-RS mapped to each of the first to third 8-port CSI resources is applied to code division multiplexing (CDM) in which a number of orthogonal weight vectors is 8.

13. A user equipment (UE) transmitting channel state information (CSI) in a wireless communication system, comprising:
   a transmitter and a receiver; and
   a processor for controlling the transmitter and receiver, wherein the processor is configured:
   to receive, from an eNB, CSI-RS (CSI-reference signal) resource information related to a plurality of CSI-RS resources corresponding to a 24-port CSI-RS resource comprising an aggregation of first to third 8-port CSI-RS resources
   the first to third 8-port CSI-RS resources being located in third and fourth OFDM symbol regions of a second slot in a single subframe on the time axis,
   the first 8-port CSI-RS resource being located in first to fourth subcarrier regions on the frequency axis,
   the second 8-port CSI-RS resource is located in fifth to eighth subcarrier regions on the frequency axis, and
   the third 8-port CSI-RS resource is located in ninth to twelfth subcarrier regions on the frequency axis;
   to receive, from the eNB, a plurality of CSI-RSs mapped to the plurality of aggregated first to third 8-port CSI-RS resources, based on the received CSI-RS resource information; and
   to report, to the eNB, CSI generated based on the plurality of CSI-RSs.

* * * * *